US011267985B2

(12) United States Patent
Freeman et al.

(10) Patent No.: US 11,267,985 B2
(45) Date of Patent: Mar. 8, 2022

(54) ANTI-TACK FORMULATION OF HIGH SOLIDS CONTENT, DILUTED ANTI-TACK FORMULATION AND METHOD OF USE OF DILUTED ANTI-TACK FORMULATION

(71) Applicant: Polymer Solutions Group, Acworth, GA (US)

(72) Inventors: Gary M. Freeman, Macon, GA (US); Quang T. Do, Kathleen, GA (US); Joshua D. Sparks, Macon, GA (US)

(73) Assignee: Polymer Solutions Group, Cleveland, OH (US)

( * ) Notice: Subject to any disclaimer, the term of this patent is extended or adjusted under 35 U.S.C. 154(b) by 105 days.

(21) Appl. No.: 16/377,557

(22) Filed: Apr. 8, 2019

(65) Prior Publication Data
US 2020/0317952 A1   Oct. 8, 2020

(51) Int. Cl.
| C09D 139/00 | (2006.01) |
| C09D 7/40 | (2018.01) |
| C08J 7/04 | (2020.01) |
| C09D 7/61 | (2018.01) |
| C09D 7/63 | (2018.01) |
| B05D 1/18 | (2006.01) |
| B05D 5/08 | (2006.01) |
| C08K 5/098 | (2006.01) |
| C08K 3/34 | (2006.01) |
| C08K 5/00 | (2006.01) |
| C08K 5/053 | (2006.01) |
| C08K 5/47 | (2006.01) |
| C08K 5/07 | (2006.01) |

(52) U.S. Cl.
CPC ............. *C09D 139/00* (2013.01); *B05D 1/18* (2013.01); *B05D 5/08* (2013.01); *C08J 7/04* (2013.01); *C09D 7/61* (2018.01); *C09D 7/63* (2018.01); *C09D 7/69* (2018.01); *B05D 2201/02* (2013.01); *C08K 3/34* (2013.01); *C08K 5/0058* (2013.01); *C08K 5/053* (2013.01); *C08K 5/07* (2013.01); *C08K 5/098* (2013.01); *C08K 5/47* (2013.01); *C08K 2201/005* (2013.01)

(58) Field of Classification Search
CPC .......... C09D 139/00; C09D 7/69; C09D 7/61; C09D 7/63; B05D 1/18; B05D 2201/02; B05D 5/08; C08J 7/04; C08K 3/34; C08K 5/0058; C08K 5/053; C08K 5/47; C08K 2201/005; C08K 5/07; C08K 5/098
USPC ...................................................... 524/451
See application file for complete search history.

(56) References Cited

U.S. PATENT DOCUMENTS

| 2,147,312 A | 2/1939 | Patridge |
| 3,765,911 A | 10/1973 | Knowles et al. |
| 3,935,124 A | 1/1976 | Thene et al. |
| 4,354,001 A | 10/1982 | Kuan |
| 5,178,676 A | 1/1993 | Lackey et al. |
| 5,700,319 A | 12/1997 | Bauer et al. |
| 6,156,117 A | 12/2000 | Freeman et al. |
| 6,228,902 B1 | 5/2001 | Brueggeman et al. |
| 6,402,827 B1 | 6/2002 | Freeman et al. |
| 6,495,163 B1 | 12/2002 | Jordan |
| 7,179,415 B2 | 2/2007 | Teoh et al. |
| 8,637,091 B2 | 1/2014 | Pluta et al. |
| 2004/0209082 A1 | 10/2004 | Lee et al. |
| 2005/0014882 A1 | 1/2005 | Brungardt et al. |
| 2006/0249050 A1 | 11/2006 | Sharma et al. |
| 2017/0198146 A1 | 7/2017 | McCarthy et al. |

FOREIGN PATENT DOCUMENTS

| CN | 110372918 | 10/2019 |
| JP | 49-18780 | 2/1974 |
| JP | 53-61639 | 6/1978 |
| JP | 55-112202 | 8/1980 |
| JP | 56-47475 | 4/1981 |
| JP | 56-47476 | 4/1981 |
| JP | 61-293233 | 12/1986 |
| JP | 62-32127 | 2/1987 |
| JP | 62-132939 | 6/1987 |
| JP | 2001-348495 | 12/2001 |
| JP | 2002-363532 | 12/2002 |
| JP | 2009-249533 | 10/2009 |
| JP | 2010-247864 | 11/2010 |
| JP | 2011-144221 | 7/2011 |
| JP | 2013-001720 | 1/2013 |

(Continued)

OTHER PUBLICATIONS

JP S55-112202 A, machine translation, JPO Japan Platform for Patent Information (J-PlatPat). (Year: 1980).*
Lowrie Ed., "Talc-Table 9.19," SME Mining Reference Handbook, Society for Mining, Metallurgy, and Exploration (SME), pp. 187-188. (Year: 2002).*
Ash et al., "Paestol® 18K" and "Polyquarternium-6," Handbook of Rheology Modifiers, Synapse Information Resources, pp. 778-779, 1615. (Year: 2006).*
JP 2013-124292 A, machine translation, IP.com. (Year: 2013).*
WO 2019/044831 A1, machine translation, IP.com. (Year: 2019).*
Stephen E. O'Rourke, "Polymer Additives for the Rubber Industry", Chemical Industry Digest, Oct. 2007.

(Continued)

Primary Examiner — Josephine L Chang
(74) Attorney, Agent, or Firm — Clark & Brody LP

(57) ABSTRACT

The present invention relates to an anti-tack formulation of high solids content that uses effective amounts of a fine particle size talc, a water soluble cationic polymer, one or more nonionic surfactants, and one or more alkali metal fatty acid soaps. The high solids content anti-tack formulation is capable of being easily shipped to a customer's location and is stable and easily pumped after shipment to a customer. The high solids content anti-tack formulation can be diluted to a low solids content formulation for use in anti-tack applications, particularly rubber slab dipping applications. The anti-tack formulation provides improved anti-tack performance when coating uncured rubber products.

26 Claims, 3 Drawing Sheets

(56) References Cited

FOREIGN PATENT DOCUMENTS

| JP | 2013-124292 | 6/2013 | | |
|---|---|---|---|---|
| JP | 2014-095010 | 5/2014 | | |
| WO | 2018/207939 | 11/2018 | | |
| WO | 2017/164171 | 2/2019 | | |
| WO | WO-2019044831 A1 | * | 3/2019 | ................ C08J 7/06 |
| ZA | 692507 | 12/1969 | | |

OTHER PUBLICATIONS

Esteban F. Aglietti, "The effect of dry grinding on the structure of talc", Applied Clay Science 9 (1994) 139-147
M. Alvarez-Silva et al., "Point of Zero Change, Isoelectric Point and Aggregation of Phyllosilicate Minerals", Canadian Metallurgical Quarterly, vol. 49, No. 4, Jul. 2010.
Ana Maria Carmona-Ribeiro et al., "Cationic Antimicrobial Polymers and Their Assemblies", International Journal of Molecular Sciences, 2013, 9906-9946.
Grim, Ralph E., "Clay Mineralogy", McGraw-Hill Book Company, 2$^{nd}$ edition, 1968.
Breen, Christopher, "The characterization and use of polycation-exchanged bentonites", Applied Clay Science 15 (1999) 187-219.
Milicevic, S. et al., "Differences in coating . . . the thermal analysis", Journal of Thermal Analysis and Calorimetry (2018) 134:1011-1019.
Product Data Sheet, Rubber, Mistron Vapor Mistron Vapor—a high performance, cost-effective alternative to carbon black in rubber, 2016, http://www.imerystalc.com/content/bu/Rubber/Products/Mistron_Vapor/index.php?source=region;2.
Product Data Sheet, MISTRON HAR, Imerys Performance Additives, 2018.
Product Data Sheet, Mistron Vapor R, Imerys Talc, 2011.
Product Data Sheet, Mistron CB, Imerys Talc, 2011.
Product Data Sheet, Luzenac 2H, Imerys Talc, 2014.
Product Data Sheet, FlexTalc Series Talc Products, CIMBAR Performance Materials, 2017.
Product Data Sheet, Microtalc U.S.P. Talcs, Specialty Minerals, 2006.
Product Data Sheet, ABT Antiblock Talcs for the plastic film industry, Specialty Minerals, 2020.

* cited by examiner

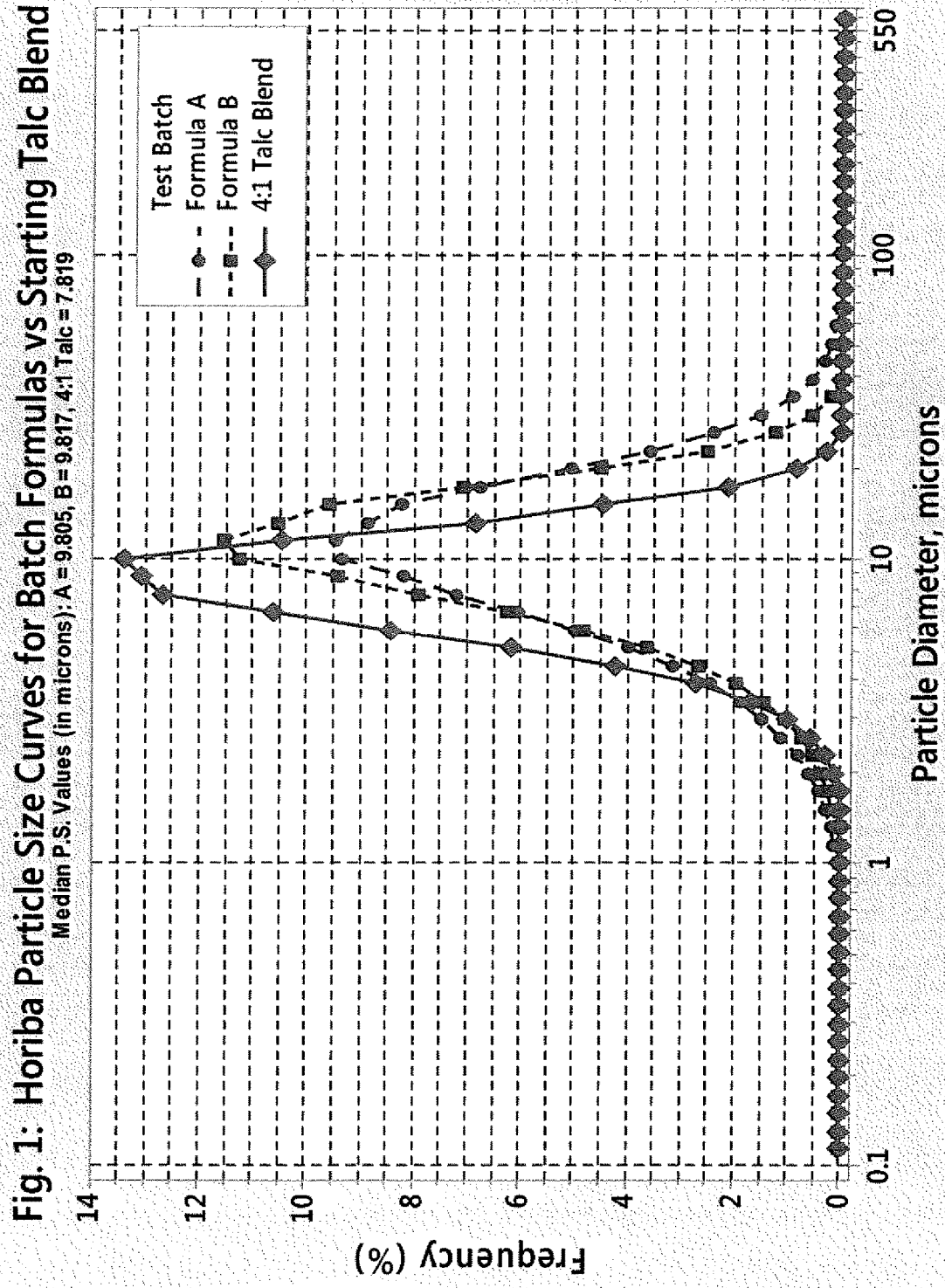

Fig. 2: Sedimentation Cylinders for 4% Dip Slurries from Formulas C, D, & E (from left to right)

Fig. 3: Uncured Rubber Pieces after Dip Coating (from left to right used 4% dips from Formulas C, D, E, & F)
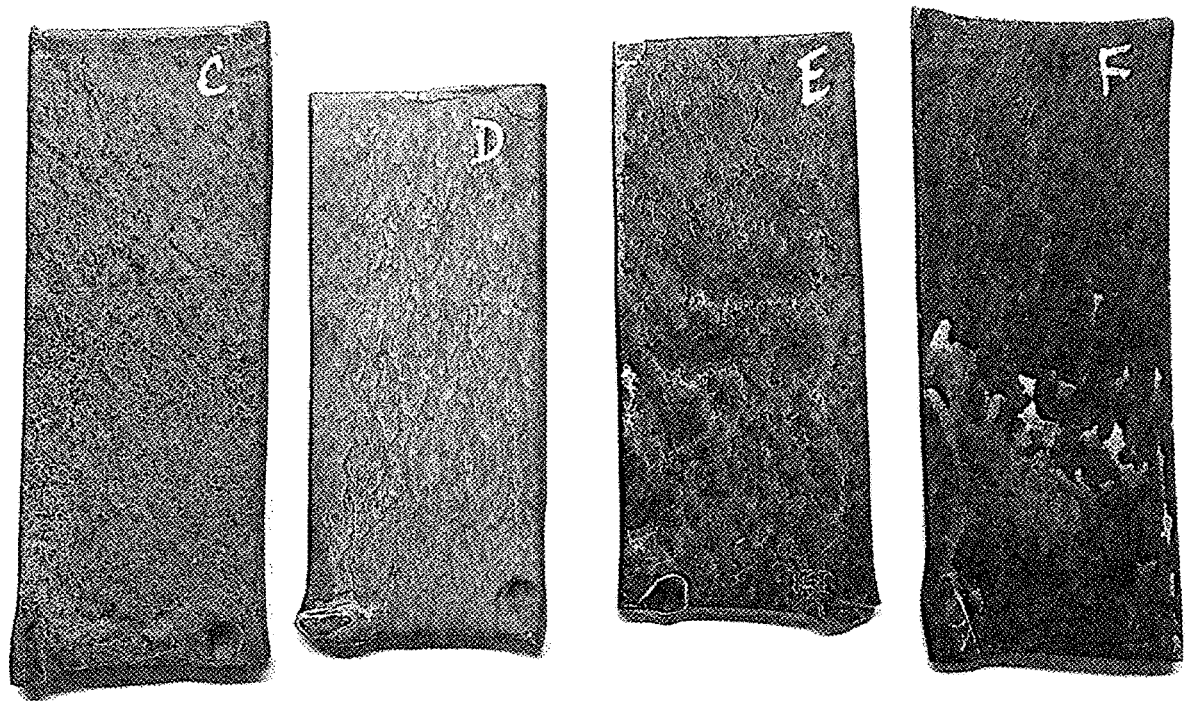

US 11,267,985 B2

ANTI-TACK FORMULATION OF HIGH SOLIDS CONTENT, DILUTED ANTI-TACK FORMULATION AND METHOD OF USE OF DILUTED ANTI-TACK FORMULATION

FIELD OF THE INVENTION

The present invention relates to an anti-tack formulation that uses primarily talc that has been cationic polymer treated for the dip slurry coating of uncured rubber compounds in anti-tack applications.

BACKGROUND ART

In the prior art, it is known to use anti-tack formulations directed to coating uncured rubber compounds. Such formulations are applied to uncured rubber to serve as a process aide. The applied coating keeps the uncured rubber slabs or pellets from sticking to itself (i.e., prevents blocking) thereby enabling the rubber compounder to more easily handle, stack or convey the uncured rubber to other unit operations such as the compression molds and to profile extrusion units.

In general terms, anti-tack formulations commonly employ a number of ingredients such as mineral pigments, swelling clays, metallic stearate pigments, alkali metal fatty acid soaps, nonionic surfactants, defoamers, pigment suspension aides, waxes, etc. Some of the prior art also discloses the use of various water soluble polymer additives to enhance the coating film properties of the applied anti-tack. Examples of water soluble polymer additives employed in the prior art are:

- carbohydrate based polymers like carboxyl methyl cellulose (CMC) or polysaccharides (like xanthan gums);
- nonionic polymers like polyvinyl alcohol (PVA) or PVA/PVAC copolymers (PVAC=polyvinyl acetate); and
- anionic polymers or copolymers based on acrylates (e.g., acrylic binders or latexes).

One application for anti-tack formulations is as a slab dip slurry of relatively low solids content. This is where freshly compounded uncured rubber coming off a two roll mill is run through a dip slurry tank containing the anti-tack formulation in diluted aqueous form to dip coat the rubber slabs. An example of a slab dip use for an anti-tack formulation is shown in U.S. Pat. No. 5,178,676. This patent discloses the use of a surfactant-treated kaolin clay for use as an anti-tack.

U.S. Pat. No. 4,354,001 discloses the use of latex polymers containing carboxylate functionality in combination with fillers as anti-tack composition but there is no teaching of the use of water soluble cationic polymers.

JP 2009 249533 discloses the use of a surfactant and a water soluble polysaccharide polymer (xanthan gum), but there is no mention of the use of a water soluble, cationic polymer nor of talc.

JP 2010 247864 discloses the use of a water soluble PVA polymer for providing an anti-tack film on unvulcanized rubber but does not disclose the use of any water soluble cationic polymers.

WO 2018207939 discloses a typical anti-tack powder product that is dispersed in water at a rubber customer's facility. Anti-tack powders of this kind are typically dispersed on site in water at low solids contents (2-6%) for use as dip slurries for rubber slabs. The inorganic silicates named in this prior art, e.g., component E, does not include talc. Instead, mica and kaolin are listed as the desired material. Also employed in this product is a Na or K fatty acid soap in combination with an organic surfactant.

WO 2017164171 is an example of an anti-tack powder composition that employs a metallic stearate pigment (like Mg stearate or Zn stearate) as an anti-block additive.

JP 2014095010 discloses an anti-tack aqueous dispersion of moderately high solids content, which when calculated has a solids content of about 33.5%. This dispersion utilizes a water soluble polymer in the formulation (e.g., carboxymethyl cellulose and xanthan gum are mentioned), but water soluble cationic polymers are not mentioned. Carboxymethyl cellulose and xanthan gum are carbohydrate-based polymers that are frequently used as rheological thickening agents or as pigment suspension aides.

JP 2013124292 discloses an anti-tack powder composition. This prior art emphasizes the desirability of using inorganic mineral pigments having a low crystalline silica content (for safety purposes with respect to possible inhalation) and it also employs nonionic surfactants (fatty alcohol ethoxylates).

JP 2011144221 discloses an anti-tack powder composition that employs two different classes of nonionic surfactants (fatty alcohol ethoxylates and acetylene-based diol ethoxylates).

JP 2002363532 discloses an anti-tack composition that emphasizes an aqueous dispersion of $CaCO_3$ and/or talc in combination with a surfactant package. However, the dispersion is produced at a low solids content, i.e., 7.5% solids based on the amount of water specified in this prior art.

JP 2001348495 discloses an anti-tack composition that employs a water soluble polymer, such as a polyvinyl alcohol, but there is no mention of using a water soluble cationic polymer in combination with talc as an anti-block pigment.

JP 56-47475 discloses an anti-tack composition that can be an aqueous, high solids formulation. However, this formulation is an emulsion derived from a combination of Na oleate soap and an unsaturated fatty acid like oleic acid. There is no disclosure of an aqueous dispersion of a silicate mineral pigment like talc nor is there any teachings concerning the use of a water soluble cationic polymer.

JP 56-47476 discloses an anti-tack composition that can be an aqueous, high solids formulation. However, this formulation is an emulsion derived from a combination of Na oleate soap, a hydroxy-terminated silicone and a fluorosurfactant. There is no disclosure of an aqueous dispersion of a silicate mineral pigment like talc nor is there any teachings concerning the use of a water soluble cationic polymer.

JP 49-18780 discloses an anti-tack composition that is an aqueous dispersion of a metal stearate anti-block pigment that is wetted with a nonionic or anionic surfactant. The total solids content is about 30% and a silicate mineral pigment such as talc is not used.

ZA 6902507 discloses an anti-tack composition that is an aqueous dispersion that consists principally of a combination of clay mineral, an alkali metal fatty acid soap, and an alkali metal alkyl sulfate surfactant. However, the solids content of the formulation is quite low (about 25%) and the use of talc or a water soluble cationic surfactant is not disclosed.

U.S. Pat. Nos. 6,156,177 and 6,402,827 disclose the formation of cationic polymer flocculated kaolin pigments for use in paper coatings. The preferred water soluble cationic polymer in that application is an Epi-DMA polymer having a Mw<50,000. Neither one of these patents are concerned with anti-tack formulations for use on uncured rubber.

In addition, the use of talc as dry anti-tack powders for dusting elastomeric compounds is well known in the art. The use of talc to produce pellet lube slurries for coating uncured rubber pellets is also well known in the industry. Such pellet lubes are typically spray-applied onto uncured rubber pellets in a rotary drum or alternatively the talc slurry is flooded onto freshly formed, hot pellets as they emerge from a rubber extruder such a Barwell extruder. In these pellet lube applications, the talc-based slurries are typically utilized at a solids content of 10-18% solids. The pellet lube formulations themselves are relatively simple compositions as they are comprised mostly of talc and various alkali metal soaps of fatty acids. One such commercial product is sold by SASCO Chemical/PSG and is called Pellet Lube F3.

Many of the anti-tack dispersions of the prior art suffer from a number of problems that mandate improved dispersions for anti-tack applications. These problems include the requirement that the dry powder products need to be mixed at a customer's site to formulate the dispersion and this requires the customers to have extensive mixing equipment. Other formulations use expensive anti-block pigments like metal stearates. Other formulations suffer from excessive foaming, pigment settling and syneresis, hard and gummy dip slurry sediments that make remixing of the dip slurry dispersion difficult, environmental concerns such as the presence of fibrous asbestiform materials or high levels of total crystalline silica (TCS) in the associated mineral pigmentation, and/or just inferior anti-tack performance.

As such, a need exists to provide improved anti-tack dispersions that avoid or minimize the problem with current anti-tack products and dispersions. The invention responds to this need by providing an improved anti-tack dispersion and method of use in anti-tack applications.

SUMMARY OF THE INVENTION

In one embodiment, the invention relates to an anti-tack formulation that can be conveniently delivered in a high solids liquid concentrate form that can be readily pumped and is easily diluted with water to a lower solids content level for end application use as a dip coating slurry. The desired anti-tack formulation is also relatively low cost as it principally employs cost effective talc pigmentation rather than requiring the use of expensive anti-block pigments such as metal stearates.

Another aspect of the invention is the use of the anti-tack formulation in an anti-tack coating application such as in the spraying of uncured rubber pellets or slab dipping of uncured rubber slabs.

Yet another aspect of the invention is diluted anti-tack formulation that is useful in anti-tack coating applications for uncured rubber compounds whereby the diluted formulation is effective at low solids contents and does not hard pack settle in dip tanks and slurry lines when left non-agitated for extended periods of time.

Other objects and advantages will be become apparent as a further description of the invention is made.

One aspect of the invention relates to an aqueous anti-tack formulation of high total solids content ranging from 45 to 75% by weight of the formulation, preferably 50-75%. The formulation includes talc particles having a Cilas median particle size range of less than 7 microns, the talc particles being present in an amount ranging from 40% to 72% of the total formulation weight.

The anti-tack formulation also includes a polyquaternary cationic polymer having a molecular weight between about 50,000 to 2,000,000 Daltons in an effective amount to at least prevent hard pack settling of the talc when the anti-tack formulation is used in a diluted form for coating uncured rubber compound products and/or improving coating coverage of the uncured rubber compound products.

The Formulation can Also have One or a Combination of the Following:

a) one or more nonionic surfactants of intermediate HLB value of 6 to 12 in a total amount ranging from about 0.01-4.0% of the total formulation weight, preferably up to about 3.0%, and more preferably about 0.5 to 2.0% by weight of the formulation; and b) one or more alkali metal, saturated or unsaturated, $C_8$-$C_{20}$ fatty acid soaps in a total amount ranging from about 0.01-3.0% of the total formulation weight, preferably less than 2.0% by weight of the formulation.

An optional additive to the formulation includes one or more suspension aids in a total amount of not more than about 2.0% by weight of the formulation.

The balance of the aqueous formulation is water.

In a more preferred embodiment, the polyquaternary cationic polymer can be in amount ranging from 0.01 to 0.25% by weight of the formulation, and more preferably less than 0.10% by weight.

In terms of viscosity, the viscosity of the aqueous anti-tack concentrate formulation can be controlled to have one or more of the following viscosities:

an initial 2 rpm static Brookfield Viscosity of 5,000 to 25,000 cps;

a two-week aged 2 rpm static Brookfield Viscosity less than 150,000 cps;

a two-week aged 20 rpm dynamic Brookfield Viscosity less than 25,000;

wherein the initial and aged static and dynamic viscosities are measured using a Brookfield RVDVE heliopath viscometer unit equipped with T-spindles and are run at 2 or 20 rpm and 25 degrees C.

The polyquaternary cationic polymer is preferably epichlorohydrin-dimethylamine (Epi-DMA), one or more polyquaterniums, or a combination thereof and more preferably polydiallyldimethyl ammonium chloride (PolyDAD-MAC).

The one or more nonionic surfactants can be selected from the group of ethoxylates of alkylphenols, ethoxylates of 2,4,7,9-tetramethyl 5 decyn-4,7-diol, ethoxylates of linear or branched fatty alcohols having a carbon chain length ranging from $C_6$-$C_{18}$, EO/PO alkoxylates of linear or branched fatty alcohols having a carbon chain length ranging from $C_6$-$C_{18}$, ethylene oxide/propylene oxide block copolymers, ethoxylates of sorbitan esters, ethoxylated fatty acids, ethoxylated castor oils, ethoxylated fatty amines, and PEG esters or diesters of saturated or unsaturated $C_8$ to $C_{20}$ fatty acids. The one or more alkali metal, saturated or unsaturated, $C_8$-$C_{20}$ fatty acid soaps can be selected from sodium or potassium soaps of saturated or unsaturated $C_8$-$C_{20}$ fatty acids.

While only one size talc particle can be used, the talc can be a blend of two differently sized talc particles wherein a size difference between the two differently-sized talc particles is at least two microns, the blend is preferably based on a weight ratio of larger to smaller particles of 1.5:1 to 9:1. The talc can also be substituted with one or more of another anti-block pigment in an amount up to 25% of the total weight of talc in the formulation. The anti-block pigment can be selected from the group consisting of kaolinite, calcined kaolin clays, smectite clay minerals such as bentonite and hectorite, attapulgite, sepiolite, barytes, nepheline syenite, calcium carbonate (ground or precipitated forms), dolomite, fine particle micas consisting of muscovite or phlogopite, feldspars, synthetic amorphous silica pigments such as precipitated silica and fumed silica, alumina trihydrate, hydrotalcite and various metal stearate pigments such as calcium stearate, magnesium stearate and zinc stearate.

Other additives that can be employed in the anti-tack formulation include one or more defoamers in a total amount of not more than about 1.0% of the total formulation weight and one or more biocides in a total amount of not more than about 0.15% by weight of the formulation.

The invention also entails a method of coating an uncured rubber compound to provide anti-tack properties to a surface of the rubber compound by using the inventive high solids anti-tack formulation, diluting it to 1-10% total solids content, preferably 2-6% and more preferably 3-4%, and applying the diluted anti-tack formulation to the rubber compound. The applications can include any type that would coat an uncured rubber compound for anti-tack purposes, and examples include a dip tank slurry application or a spraying application.

A more preferred anti-tack formulation is one that uses at least polydiallyldimethyl ammonium chloride as the polyquaternary cationic polymer, and a combination of both the nonionic surfactant and the one or more alkali metal, saturated or unsaturated, $C_8$-$C_{20}$ fatty acid soaps, with the nonionic surfactant preferably being one or more of ethoxylates of tridecyl alcohol and ethoxylates of 2,4,7,9-tetramethyl 5 decyn-4,7-diol nonionic surfactants and the one or more alkali metal, saturated or unsaturated, $C_8$-$C_{20}$ fatty acid soaps being one or more sodium or potassium soaps of saturated or unsaturated $C_8$-$C_{20}$ fatty acids, and one or more pigment suspension aides of fumed silica, xanthan gum and sepiolite.

Yet another aspect of the invention is providing an aqueous anti-tack formulation comprising the high solids content anti-tack formulation described above in diluted form such that the total solid content ranges from about 1 to 0%. This formulation can also have the same aspects of the high solids formulation in terms of different talc particle sizes, the substitution of talc with one or more anti-block pigments, presence of optional additives, and the like. For the diluted anti-tack formulation, it is preferred that it has a relative sediment volume (RSV) of at least 35 $cm^3$, the relative sediment volume measured using 1000 ml of a 4% solids diluted form of the anti-tack slurry formulation in a 1 liter graduated cylinder after 24 hours of static settling.

A further aspect of the invention is a method of making the aqueous anti-tack formulation having a total solids content ranging from 45-75%. This method includes adding a number of components together to make the anti-tack formulation. More particularly, the adding step adds an amount of at least one size of fine particle size talc, an amount of one or more polyquaternary cationic polymers, an amount of either or both of: (i) one or more nonionic surfactants of intermediate HLB value of 6 to 12; and (ii) one or more alkali metal, saturated or unsaturated, $C_8$-$C_{20}$ fatty acid soaps, an optional amount of one or more suspension aids, defoamers, and biocides, and water to form the aqueous anti-tack formulation. When adding these various components together, the amount of the one or more polyquaternary cationic polymers is made into an aqueous solution and this aqueous solution is used when making the anti-tack formulation by adding the other components together.

BRIEF DESCRIPTION OF THE DRAWINGS

FIG. 1 is a Horiba laser light scattering particle size distribution curve showing the particle size distribution for two different anti-tack formulations as compared to the particle size distribution of the starting talc pigmentation.

FIG. 2 is a photograph of three liter sedimentation cylinders for different talc-based anti-tack formulations showing their relative sedimentation volumes.

FIG. 3 are photographs of uncured rubber compound slabs after being dip coated with different talc-based anti-tack formulations.

DETAILED DESCRIPTION OF THE INVENTION

Most rubber anti-tack products are produced and delivered in dry powder form. Dry powder products maximize solids content from a freight delivery standpoint but they require extensive mixing equipment on site at the customer's location to properly disperse the products into aqueous dip slurries. Also, the aforementioned dispersion process requires plant personnel to oversee its production to insure the powder makedown protocol yields well dispersed dip slurries of appropriate % solids content. In many cases, the mixing process requires heating of the batch water to facilitate wetting, swelling, and dispersion of the various anti-block mineral pigments and extended mixing times to achieve good dispersion. These mixing challenges are particularly the case when the anti-tack powder formulation utilizes any significant amount of swelling clays such as bentonites.

Providing the anti-tack formulation in pre-dispersed slurry form provides a level of quality and ease of use for the customer. Liquid concentrates can be readily diluted with water to the desired target solids on site using automated dilution/mixing systems requiring minimal oversight. Such liquid concentrates do not require heating since the anti-block pigments therein are already wetted and well dispersed. However, it is desirable to provide the liquid concentrate of an anti-tack formulation in a high solids content form to minimize their freight costs during shipment. The liquid concentrate should also be stable yet fluid and should be easily pumped from totes or other containers using conventional positive displacement pumps. The liquid anti-tack formulation of this invention meets these utility requirements by providing a talc dispersion having a solids content equal to or greater than 45%, which is easily handled and pumped, more preferably 50% or more. While there is no upper end to the solid contents of the talc dispersion, a practical upper limit is about 75%, and solids contents above this amount are just too viscous to be high shear mixed and easily pumped once transported to a customer's facilities.

Many prior art anti-tack formulations employ expensive anti-block pigments such as metal stearate pigments of calcium, magnesium or zinc in appreciable amounts or they can employ expensive anti-block additives such as waxes or film forming polymers (like polyvinyl alcohol). Minimizing the use of such expensive chemical additives is essential to controlling the final cost of the formulation. It is therefore particularly desirable to develop a low cost anti-tack coating formulation based principally on mineral pigments that is effective in reducing the tackiness of uncured elastomeric compounds in slab or pellet form when applied as a coating film via a dip tank slurry application or via a spray application. The anti-tack formulation should be effective when applied to the uncured rubber slab at a diluted solids content of 2-6% by weight. The diluted solids content can range from 1-10% to a more preferred range of 2-6%, and even more preferred range of 3-4%.

The anti-tack formulations of the invention are principally comprised of one or more fine particle size talc pigments that are low cost mineral pigments being produced from various dry grinding processes such as a pin mill, a roller mill, an air swept impact mill or a jet mill based dry grinding/classification process. Talc pigments produced by water washed-based mineral processing technologies are known and also commercially available. The water-washed talc pigments can also be used but they are typically more expensive than the dry ground grades and they are not absolutely necessary for producing effective anti-tack formulations in accordance with the invention.

However, it is important to employ talc pigments produced from high grade ores that contain a minimal amount of other mineral impurities in them. The ore materials should contain preferably no or at most trace ppm type levels of any fibrous asbestiform materials and they should also contain a negligible amount of total crystalline silica (TCS) content because of the respiratory health hazards attributed to these materials. The TCS content is analytically determined by X-ray Diffraction (which has a detection limit of 0.10%) and is defined as the collective sum of all the crystalline silica species that are present in the mineral product as minor impurities. With respect to the TCS value determined by XRD, the three crystalline silica species of primary respiratory concern are quartz, cristobalite and tridymite. In the inventive anti-tack formulations, it is therefore preferred that the fine particle talc pigments have a TCS content less than 0.5% by weight and more preferably have a TCS content less than 0.3% by weight. On a total liquid formulation basis this puts the amount of TCS content to be less than 0.25% by weight of the total formula or more preferably to be less than 0.15% by weight of the total formula.

Given the recent rollout of reduced OSHA occupational exposure guidelines for respirable crystalline silica in general industry applications (see 29 C.F.R. 1910.1053) rubber compounders are becoming increasingly concerned about using anti-tack formulations that contain high levels of crystalline silica content. Many rubber compounders are requiring that suppliers provide anti-tack products that have TCS contents less than 1% or frequently even lower in order to meet these environmental exposure standards. As such, utilizing fine particle talc pigments that can meet these requirements is an important aspect of the inventive formulations.

Beyond its low cost, fine particle talc is of interest to use in anti-tack formulations because its platelet morphology provides good anti-block properties while its moderately hydrophobic surface lends to good affinity of the particles to elastomeric surfaces. Talc is also recognized as providing very good slip and lubrication properties. For example, the use of talc as dry anti-tack powders for dusting elastomeric compounds is well known in the industry. Furthermore, the use of talc pigmentation in pellet lube formulations for coating uncured rubber pellets is known in the art as discussed above in connection with the Pellet Lube F3 product. While such talc formulations are effective for coating rubber pellets at solids contents of 10-18%, they are less effective as anti-tacks when used as rubber slab dip slurries at lower solids contents of 3-4% solids. While a fine particle talc plus fatty acid soap combination provided in slurry form provides some desirable properties it still suffers from several disadvantages that limit its ease of use and utility for rubber slab dip applications and these are detailed below.

a. Talc slurries in high solids slurry concentrate form are frequently difficult to stabilize so as to inhibit syneresis and pigment settling. Accordingly, significant amounts of various suspension aides, such as CMC, xanthan gum, or bentonite, are commonly employed in the formulations to improve their pigment suspension properties.

b. Despite the use of suspension aides in a talc slurry concentrate, its subsequent dilution into waterborne slurries of about 3-4% solids content for subsequent potential use as a rubber slab dip normally results in dip slurries with poor talc suspension properties. Even when fine particle grades are employed, the talc pigmentation in the dip slurry settles rapidly and tends to form hard packed or gummy sediments which are very difficult to re-stir into suspension.

c. When utilized as rubber slab dip slurries at 3-4% solids content, the talc-based pellet lubes frequently yield poor coating coverage of uncured rubber grades such that poor anti-tack performance is obtained. The slab dip slurries derived from pellet lubes do not wet the elastomeric surface very well and consequently they tend to run off the rubber in streaks rather than provide a uniform continuous coating film.

d. The heavy reliance on using alkali metal fatty acid soaps in talc-based pellet lube formulations can frequently lend to the formation of notable amounts of foam in the dip slurry tank systems that must be proactively managed to keep under control. The generation of excessive foam in the dip slurry tanks can often create problems with respect to uniform coating coverage on the rubber slab and/or the pickup of clumps of foam froth that can dry down to form crusty areas on the rubber slab which can trap moisture underneath. The trapping of moisture underneath these dried clumps of foam can subsequently result in the formation of blisters during the subsequent molding or profile extrusion stages of final rubber product manufacture. Hence using anti-tack formulations that have low potential for producing foam in the dip tank systems are very desirable.

In contrast to the aforementioned pellet lubes and other prior art discussed above, the talc-based anti-tack formulations of this invention address the previous performance shortcomings associated with talc-dominated formulations because the talc pigmentation therein has now been flocculated with one or more water-soluble cationic polymers. The details of the water soluble cationic polymer are discussed below. The talc-based anti-tack formulations of this invention possess a number of advantageous attributes that provide a number of improvements over prior art anti-tack formulations. The attributes are discussed below.

The inventive formulation can be produced in a high solids concentrate form (slurry solids content being equal to or greater than 45%, more preferably 50% or more) that is stable and is easily pumped and readily diluted as needed. It is a low cost anti-tack formulation whereby expensive anti-block pigments or additives like metal stearates or waxes are not needed to yield a product that provides good anti-tack coating coverage on uncured rubber compounds. The high solids content is desirable from the standpoint of minimizing freight costs when shipping the product to distant customer locations.

All of the pigmentation is pre-dispersed and fully wetted in the formulation so it does not require any heating nor extended mixing times when diluted on-site for subsequent use. The product is ready to use as soon as it is diluted with water to the proper solids content. This can be accomplished with minimal supervision through the utilization of an automated dilution and metering system whereby slurry concentrate is pumped from a delivery tote into the dilution system, water is added, the combination is mixed for several minutes until homogeneous, and the solids content is continuously monitored via an inline probe and adjusted accordingly based on the target set point. The diluted anti-tack slurry product is then sent to the rubber line's dip tank system for application use. Automated dilution and metering system for drawing down a high solids slurry to a lower solids content are well known and an example of such a system is commercially provided or sold by SASCO/PSG.

The inventive talc based formulation when diluted to 3-4% solids content performs as an effective rubber slab dip formulation. It provides good anti-tack coverage on a wide array of uncured rubber compounds. Because the talc pigmentation has been lightly to moderately flocculated through the addition of a water-soluble cationic polymer, the agglomerated particles of talc will settle to yield soft, fluffy wet sediments that do not become hard packed if mixing in the dip slurry tanks is ever discontinued for extended periods of time. This fluffier sedimentation arising from a dip slurry of the inventive formulation is clearly reflected by the fact that the resultant wet sediments of talc exhibit a higher RSV value (RSV=relative sediment volume). Being soft and fluffy, the wet sediments of talc arising from the inventive formulations are found to be easily stirred back into suspension when mixing is resumed.

The concept of RSV for wet pigment sediments has been previously explained and discussed in U.S. Pat. No. 6,156,117. As disclosed there, the RSV value or wet void volume for a given mineral pigment is a measure of how densely the individual particles from an aqueous suspension have been packed together once they have completely settled into a wet sediment. The more compact or denser the mineral sediment is the less wet void volume there will be in the sediment. RSV (or wet void volume) results from imperfect particle packing arising from the shape(s) of the various particles that are present. Flocculation of the platy talc particles with a water soluble cationic polymer results in the formation of agglomerates that are irregularly shaped and of different sizes and this consequently results in imperfect particle packing. Dense phase packing of the talc platelets is also likely prevented by steric hindrance as a single long-chain water soluble cationic polymer is most likely attached to several talc particles via multiple points of ionic interaction. Hence, segments of the polymer chain thereby act as spacers to keep these platelets within the agglomerate physically separated from one another by a certain small distance. As such, it is believed that the agglomerates are likely loosely bound collections of talc platelets having interparticle spaces rather than being tightly bound, compacted collections of talc platelets. The overall magnitude of RSV increase can be impacted by the particle size of the starting talc, the amount of surfactant that is present in the formula and the overall dosage of the water soluble cationic polymer that is employed. However, increases in RSV on the order of 1.5-6 times greater have been observed when RSV comparisons are made to sediments arising from similar talc formulations not employing any water soluble cationic polymer like PolyDADMAC. For purposes of experimental comparison, the RSV of different talc anti-tack formulations have been assessed as 4% solids dip slurries after 6 hours and then again after 24 hours of static settling. No further change in RSV is typically noted beyond the 24 hour time period. It is believed that RSV values of 35 $cm^3$ or more when measured for 24 hours for a diluted anti-tack formulation, preferably more than 50 $cm^3$, provide the desired anti-tack properties when treating an uncured rubber compound using the inventive anti-tack formulation in an anti-tack application like spraying or dip slurry use. A more detailed explanation of the manner of measurement of the RSV value is given below.

A particularly effective water-soluble cationic polymer for the inventive anti-tack formulations are PolyDADMAC polymers (PolyDADMAC=polydiallyldimethyl ammonium chloride) of moderately high to high molecular weight. PolyDADMAC polymers having Mw values, as determined by GPC-T, ranging from about 200,000 Daltons to 2,000,000 Daltons are useful in the inventive process however a particularly effective Mw for the PolyDADMAC flocculating agent used in the inventive formulation is about 500,000 Daltons. A feature of the inventive formulation is the formation of fluffy talc sediments that could be easily stirred back into suspension with low shear agitation. In other talc-based anti-tack formulations, the talc wet sediments are frequently hard-packed or even in cases where they are not hard packed the talc wet sediments are instead gummy in nature and still highly problematic to re-suspend with moderate agitation.

While PolyDADMAC is one water soluble cationic polymer that is preferred for use in the inventive anti-tack formulations, other water soluble cationic polymers having a Mw range, as determined by GPC-T, ranging from about 50,000 Daltons to 2,000,000 Daltons and ability to form fluffy talc sediments that can be easily stirred back into suspension with low shear agitation can be used as the water soluble cationic polymer of the invention. One or more water soluble cationic polymers can be used as part of the anti-tack formulation of the invention. Examples of other cationic polymers include epichlorohydrin-dimethylamine (Epi-DMA), and polyquaterniums, including. cationic polyacrylamides (CPAM) and quaternized modifications of various polyamine polymers. Some representative examples of synthetic polyamines that are suitable for quaternization include polyethyleneimine (PEI), poly(amidoamine)s (PAA), poly(amino-co-ester)s (PAE) and poly(2-N,N-dimethylaminoethylmethacrylate) (PDMAEMA). In addition, the range of polyquaternary polymers commonly referred to as polyquaterniums in the cosmetic and personal care industry are suitable cationic polymers. Some common polyquaterniums known in the art are found in the list below. It should be understood that this listing of polyquaterniums is only exemplary and that other known polyquaterniums in the art can be used as the polyquaternary cationic polymer of the invention. It should be noted that in the list below, polyquaternium-6 corresponds to the PolyDADMAC mentioned above.

List of Polyquaterniums[1]

| Polyquaternium | Chemical Identity |
|---|---|
| Polyquaternium-1 | Ethanol, 2,2',2''-nitrilotris-, polymer with 1,4-dichloro-2-butene and N,N,N',N'-tetramethyl-2-butene-1,4-diamine |
| Polyquaternium-2 | Poly[bis(2-chloroethyl) ether-alt-1,3-bis[3-(dimethylamino)propyl]urea] |
| Polyquaternium-4 | Hydroxyethyl cellulose dimethyl diallylammonium chloride copolymer; Diallyldimethylammonium chloride-hydroxyethyl cellulose copolymer |
| Polyquaternium-5 | Copolymer of acrylamide and quaternized dimethylammoniumethyl methacrylate |
| Polyquaternium-6 | Poly(diallyldimethylammonium chloride) |
| Polyquaternium-7 | Copolymer of acrylamide and diallyldimethylammonium chloride |
| Polyquaternium-8 | Copolymer of methyl and stearyl dimethylaminoethyl ester of methacrylic acid, quaternized with dimethylsulphate[2] |
| Polyquaternium-9 | Homopolymer of N,N-(dimethylamino)ethyl ester of methacrylic acid, quaternized with bromomethane |
| Polyquaternium-10 | Quaternized hydroxyethyl cellulose |
| Polyquaternium-11 | Copolymer of vinylpyrrolidone and quaternized dimethylaminoethyl methacrylate |
| Polyquaternium-12 | Ethyl methacrylate/abietyl methacrylate/diethylaminoethyl methacrylate copolymer quaternized with dimethyl sulfate |
| Polyquaternium-13 | Ethyl methacrylate/oleyl methacrylate/diethylaminoethyl methacrylate copolymer quaternized with dimethyl sulfate |
| Polyquaternium-14 | Trimethylaminoethylmethacrylate homopolymer |
| Polyquaternium-15 | Acrylamide-dimethylaminoethyl methacrylate methyl chloride copolymer |
| Polyquaternium-16 | Copolymer of vinylpyrrolidone and quaternized vinylimidazole |
| Polyquaternium-17 | Adipic acid, dimethylaminopropylamine and dichloroethylether copolymer |
| Polyquaternium-18 | Azelaic acid, dimethylaminopropylamine and dichloroethylether copolymer |
| Polyquaternium-19 | Copolymer of polyvinyl alcohol and 2,3-epoxypropylamine |
| Polyquaternium-20 | Copolymer of polyvinyl octadecyl ether and 2,3-epoxypropylamine |
| Polyquaternium-22 | Copolymer of acrylic acid and diallyldimethylammonium Chloride |
| Polyquaternium-24 | Quaternary ammonium salt of hydroxyethyl cellulose reacted with a lauryl dimethyl ammonium substituted epoxide. |
| Polyquaternium-27 | Block copolymer of Polyquaternium-2 and Polyquaternium-17 |
| Polyquaternium-28 | Copolymer of vinylpyrrolidone and methacrylamidopropyl trimethylammonium |
| Polyquaternium-29 | Chitosan modified with propylen oxide and quaternized with epichlorhydrin |
| Polyquaternium-30 | Ethanaminium, N-(carboxymethyl)-N,N-dimethyl-2-[(2-methyl-1-oxo-2-propen-1-yl)oxy]-, inner salt, polymer with methyl 2-methyl-2-propenoate |
| Polyquaternium-31 | N,N-dimethylaminopropyl-N-acrylamidine quaternized with diethylsulfate bound to a block of polyacrylonitrile |
| Polyquaternium-32 | Poly(acrylamide 2-methacryloxyethyltrimethyl ammonium chloride) |
| Polyquaternium-33 | Copolymer of trimethylaminoethylacrylate salt and acrylamide |
| Polyquaternium-34 | Copolymer of 1,3-dibromopropane and N,N-diethyl-N',N'-dimethyl-1,3-propanediamine |
| Polyquaternium-35 | Methosulphate of the copolymer of methacryloyloxyethyltrimethylammonium and of methacryloyloxyethyldimethylacetylammonium |
| Polyquaternium-36 | Copolymer of N,N-dimethylaminoethylmethacrytate and buthylmethacrylate, quaternized with dimethylsulphate |
| Polyquaternium-37 | Poly(2-methacryloxyethyltrimethylammonium chloride) |
| Polyquaternium-39 | Terpolymer of acrylic acid, acrylamide and diallyldimethylammonium Chloride |
| Polyquaternium-42 | Poly[oxyethylene(dimethylimino)ethylene (dimethylimino)ethylene dichloride] |
| Polyquaternium-43 | Copolymer of acrylamide, acrylamidopropyltrimonium chloride, 2-amidopropylacrylamide sulfonate and dimethylaminopropylamine |
| Polyquaternium-44 | 3-Methyl-1-vinylimidazolium methyl sulfate-N-vinylpyrrolidone copolymer |
| Polyquaternium-45 | Copolymer of (N-methyl-N-ethoxyglycine)methacrylate and N,N-dimethylaminoethylmethacrylate, quaternized with dimethyl sulphate |
| Polyquaternium-46 | Terpolymer of vinylcaprolactam, vinylpyrrolidone, and quaternized vinylimidazole |
| Polyquaternium-47 | Terpolymer of acrylic acid, methacrylamidopropyl trimethylammonium chloride, and methyl acrylate |

1 Iwata. Hiroshi; Shimada, Kunio (2012-10-02). *Formulas, ingredients and Production of Cosmetics: Technology of Skin- and Hair-Care Products in Japan* (https://books.google.com/books?id=QvDxRLtnXVQC). Springer Science & Business Media. ISBN 9784431540618.

In terms of useful cationic polymers, it should also be noted that polyquaternary polymers are recommended for use as the pKa value associated with polyamines is usually too low in relation to the typical operable pH range of 8.5-10.5 for the talc based anti-tack formulations of this invention such that the polyamines will largely be present in a non-protonated form. Consequently, this means that polyamines will not be cationic in the operable pH range.

In an effort to judge the size of the talc agglomerates being produced by the interaction of the water soluble cationic polymer, when PolyDADMAC is preferably used, with the individual talc platelets, testing was conducted to examine the change in the particle size distribution of the talc pigmentation used therein. Using a Horiba LA-300 laser light scattering analyzer, the median particle size and particle size distribution properties of the starting talc feedstock was characterized and then the resultant changes in those particle size properties upon treatment of the talc with the water soluble cationic polymer, i.e., the PolyDADMAC polymer, that is employed in the formulation were examined. A shift in the overall particle size distribution is seen in FIG. 1 as a consequence of the cationic polymer behaving as a flocculant and creating loosely bound agglomerates of the talc platelets. The net result is about a 25% increase in the median particle size value associated with the agglomerated talc species being created as compared to its starting talc control without any water soluble cationic polymer, e.g., PolyDADMAC.

While the exact mode(s) of interaction between water soluble cationic polymer, e.g., PolyDADMAC, and the talc particles in the inventive formulations are not totally understood, it is believed that it is particularly beneficial to use dry ground talc grades. In its highly crystalline, virgin form, talc is a layered silicate structure consisting of octahedral-coordinated $Mg^{VI}$ that is sandwiched between two layers of tetrahedral-coordinated $SiO_4$ with no residual surface charges, no cation exchange capacity (CEC), and therefore without interlayer cations. In the mineralogy literature, see E. F. Aglietti, Applied Clay Science, Vol. 9, 1994, pp. 139-147, it is known that significant physicochemical effects can occur when talc is subjected to intense dry grinding processes due to its low Mohs hardness. The layers in talc are bonded together only by weak Van der Waals forces which make it sensitive to grinding processes. Beyond just simple reduction in its particle size, the dry grinding of talc yields increases in surface area, porosity, CEC, and also solubility that creates very reactive surfaces. For example, Aglietti's published test data indicate that $Mg^{+2}$ levels as high as 400 meq Mg/100 g of mineral can be solubilized from talc and that CEC values as high as 20 meq/100 g can be created for talc depending on the extent of grinding. The increased solubility of $Mg^{+2}$ from ground talc in alkaline media is undoubtedly a driver to the creation of its observed anionic surface charge. The anionic surface charge of ground talc in aqueous media at pH's of 8.0-10.0 can be substantial with zeta potential values around −40 to −50 mV being reported in the mineralogy literature. This is shown in FIG. 3 of the technical publication of J. A Finch, et. al., Canadian Metallurgical Quarterly, Vol. 49, No. 4, 2010, pp. 405-410. The creation of CEC and substantial anionic surface charge therefore provide two different modes of possible ionic attachment between the ground talc particles and the PolyDADMAC polymer as the water-soluble, polycationic electrolyte.

Another feature of the invention is a dramatic improvement in anti-tack coating efficiency and the rate of drying of the applied slab dip film on uncured rubber compounds that is highly beneficial. This improvement in anti-tack coating efficiency and film drying enables the lightly-to-moderately flocculated talc based formulations of the invention to be used effectively as rubber slab dip slurries, for example dip slurries having a 3-4% solids content. In contrast, traditional talc based pellet lubes, wherein the talc particles are not flocculated, are far less effective as anti-tacks when utilized at low solids levels. This improvement in anti-tack performance has therefore allowed low cost, talc based anti-tack formulations to be developed that are highly effective for slurry slab dip applications which can still be produced as a slurry concentrate of at least 45% solids, preferably at least 50% solids, and they do not suffer from any of the hard pack or gummy dip slurry pigment settling issues normally associated with formulas using high levels of talc pigmentation.

In order to formulate effective anti-tack formulations utilizing talc and a water soluble cationic polymer like PolyDADMAC that results in a lightly to moderately flocculated talc product, it is preferred to employ nonionic surfactants of intermediate HLB value (HLB=6-12) as interfacial wetting agents in the formula. One or more nonionic surfactants of intermediate HLB value are commonly employed in the anti-tack formulation at combined concentration levels up to 4.0% by weight of the total formulation weight, preferably up to 3.0%, and more preferably between about 0.5 and 2.0% by weight of the total formulation weight. The term HLB stands for the Hydrophilic/Lipophilic Balance value for a surface active agent. Intermediate HLB nonionic surfactants typically exhibit lower foam potential than high HLB nonionic surfactants whereby the HLB value is substantially greater than 12. The intermediate HLB nonionic surfactants also typically exhibit lower foam properties as compared to other classes of wetting agents (e.g., anionic, cationic and amphoteric surfactants) that might be considered. Two intermediate HLB nonionic surfactants that are particularly useful in the inventive anti-tack formulation are ethoxylates of tridecyl alcohol (e.g., Ethal TDA-5; HLB=10.4) and ethoxylates of 2,4,7,9-tetramethyl 5 decyn-4,7-diol (e.g., Surfynol 440; HLB=8.0). However, other types of nonionic surfactants that would work in the formulation as well so long as their hydrophobic and hydrophilic segments therein are selected to be in balance with each other so as to yield an intermediate HLB value of 6-12 include the following nonionic chemistries: ethoxylates of alkylphenols, ethoxylates of other linear or branched fatty alcohols having a carbon chain length ranging from $C_6$-$C_{18}$, EO/PO alkoxylates of linear or branched fatty alcohols having a carbon chain length ranging from $C_6$-$C_{18}$, ethylene oxide/propylene oxide block copolymers, ethoxylates of sorbitan esters, ethoxylated fatty acids, ethoxylated castor oils, ethoxylated fatty amines and PEG esters or diesters of saturated or unsaturated $C_8$ to $C_{20}$ fatty acids.

Furthermore, it is preferred to include anionic surfactants, such as alkali metal fatty acid soaps to the anti-tack formulation, either alone or in combination with the nonionic surfactants.

The following provides more explanation regarding the use of the nonionic surfactants alone or in combination with the anionic surfactants, or the anionic surfactants alone as part of the inventive anti-tack formulation. In the talc-based anti-tack formulations of the invention, one will recognize that the critical formulary components therein are the fine particle size talc pigments which serve as anti-block partitioning agents, the polyquaternary cationic polymer, which serves to effectively flocculate the talc particles into loosely bound agglomerates that accordingly improve the settling characteristics of the talc pigmentation and also improve its anti-tack coating performance properties when, for example, the formulation is dip coated onto uncured rubber compounds, and lastly the employment of one or more organic based, surface active wetting agents, i.e., the nonionic and anionic surfactants, which assist in the interfacial wetting of the talc particles and the surface of the uncured rubber compound. This interfacial wetting assists in bringing the talc particles and the uncured rubber surface into intimate contact with one another so as to yield a pigmented coating film on the surface of the uncured rubber compound for purposes of reducing its surface tackiness. In the preferred embodiment of the invention, one would preferably utilize one or more intermediate HLB (HLB=6-12) nonionic surfactants in combination with one or more alkali metal, saturated or unsaturated, $C_8$-$C_{20}$ fatty acid soaps as the wetting agent package. The intermediate HLB nonionic surfactants are particularly effective in wetting the talc pigmentation but select nonionic surfactants can also aide in wetting the surface of the uncured rubber compound. The alkali metal, saturated or unsaturated, $C_8$-$C_{20}$ fatty acid soaps are particularly effective in wetting the surface of the uncured rubber compound and are excellent film formers on the rubber, which aide in forming a talc pigmented film. However, the lower chain length $C_8$-$C_{12}$ alkali metal soaps can also function as pigment wetting agents. Given these overall performance characteristics, it is understandable that using combinations of nonionic surfactants and anionic soaps would be particularly advantageous in the inventive talc based anti-tack formulations in terms of providing good interfacial wetting as well as good film forming properties. However, one skilled in the art will recognize that very careful selection of either the nonionic surfactant candidates or the alkali metal, saturated or unsaturated, $C_8$-$C_{20}$ fatty acid soaps (which are anionic surfactants) can enable effective anti-tack formulations to be created using just one class of surface active wetting agent (nonionic or anionic) rather than utilizing combinations of the two (nonionic plus anionic). So in the broadest scope of the invention, the organic based, surface active wetting agent package can be just nonionic surfactant(s) (one or more types), or just anionic alkali metal, saturated or unsaturated, $C_8$-$C_{20}$ fatty acid soap(s) (one or more types), or preferably combinations of these two classes of surface active wetting agents whereby one or more nonionic surfactants are combined with one or more anionic soaps. As discussed elsewhere, the only limitation that needs to be kept in mind with respect to using the anionic soaps is the potential for side reactions with the polyquaternary cationic polymer if their respective concentrations in the formulation become too high.

When using the anionic surfactants in the anti-tack formulation, it is preferred to keep the amount of anionic surfactants to a minimum in the formulation. The reason for this is because of potential reaction interferences with the water soluble cationic polymer, e.g., PolyDADMAC. At high concentration levels of the water soluble cationic polymer, e.g., PolyDADMAC, and of the anionic soaps present in the formulation, some resultant reaction products arising from the ionic bonding of the cationic quaternary groups within the polymer with the anionic carboxylate groups associated with the fatty acid soap can undesirably occur. Such ionic reaction products between cationic polyelectrolytes and anionic surfactants are known in the prior art, see for example Chinese patent CN 104923079 B, and these situations should be avoided in the inventive formulation. To that end, total fatty acid soap contents in the inventive formulations should be maintained at levels of about 3.0% by weight of the total formulation or less and more preferably equal to or less than 2.0% by weight of the total formulation to minimize the potential for side reactions with the water soluble cationic polymer, e.g., PolyDADMAC. In summary, a relatively low level and effective amount of alkali metal fatty acid soap for providing good film forming properties on the uncured rubber substrate is needed in the anti-tack formulation while keeping the soap level low enough to also minimize the potential for any side reactions with the water soluble cationic polymer, e.g., PolyDADMAC. Examples of preferred alkali metal fatty acid soaps include sodium or potassium soaps of saturated or unsaturated $C_8$-$C_{20}$ fatty acids. Representative examples of such soaps would be either the sodium or potassium salts of fatty acids like caprylic acid, capric acid, lauric acid, myristic acid, palmitic acid, stearic acid, palmitoleic acid, oleic acid, linoleic acid, linolenic acid, ricinoleic acid and mixtures thereof. Common animal or vegetable sources of such fatty acids include but are not limited to tallow fatty acid, tall oil fatty acid, coconut fatty acid, soybean fatty acid, palm fatty acid and castor oil fatty acid.

Similarly, the water soluble cationic polymer, e.g., PolyDADMAC, dosage levels in the inventive formulation need to be sufficient to provide an effective degree of talc particle flocculation while also keeping its concentration level low enough to minimize the potential for any side reactions with the alkali metal fatty acid soaps being used therein. These end-use requirements are mutually accomplished by utilizing the water soluble cationic polymer, e.g., PolyDADMAC, at active basis dosage levels equal to or less than 0.25% by weight of the total formulation or more preferably at active basis dosage levels equal to or less than 0.10% by weight of the total formulation. On a dry talc basis, the effective amounts of water soluble cationic polymer, e.g., PolyDADMAC, treatment employed are equal to or less than 0.50% by weight of talc or more preferably equal to or less than 0.20% by weight of talc.

Given the anti-tack performance benefits derived from flocculating the talc with a water-soluble cationic polymer, another object of the invention is to develop a high-shear slurry dispersion process whereby water soluble cationic polymer, e.g., PolyDADMAC, and the talc particles can be brought together in an effective manner to yield a high solids slurry concentrate of lightly to moderately flocculated talc particles having acceptable rheological properties for stability and pumpability purposes. To this end, it is desirable that the amount of cationic polymer employed in the formulation be effective in improving the coating efficiency of the 3-4% solids dip slurry and in inhibiting hard pack or gummy settling of the talc pigmentation at very low active basis dosage levels. Otherwise, excessive flocculation of the talc particles in the slurry concentrate can translate to very high formulation viscosities that are not manageable from a mixing and pumpability standpoint.

The use of an effective amount of the cationic polymer is described in more detail as follows.

In the talc-based anti-tack formulations of the invention the active basis dosage of polyquaternary cationic polymer is critical to its functional performance properties in both the high solids slurry concentrate form of 45%-75% solids as well as in its subsequent diluted form of 1-10% solids which is commonly referred to as the anti-tack slab dip slurry. In the high solids slurry concentrate of 45%-75% solids, an effective amount of polyquaternary polymer, such as PolyDADMAC, needs to be employed for the following reasons:

1) An effective amount of polyquaternary polymer is needed to mildly to moderately flocculate the talc pigmentation, as reflected by a change in the talc's particle size distribution, while yielding a stable dispersion of flocculated talc particles that exhibits acceptable rheological properties in terms of its initial and aged Brookfield properties, as measured at 2 rpm and 20 rpm. An effective amount of polyquaternary polymer will increase the Horiba LLS median particle size of the talc pigmentation therein on the order of about 5%-40% which reflects the formation of loosely bound agglomerates of talc. The formation of the talc agglomerates in the concentrate formulation is essential to the resultant dip performance properties of the low solids slab dip slurry upon dilution of the concentrate with water.

2) The dosage of polyquaternary cationic polymer that is employed will have an effect on the concentrate formula's resultant rheological properties. An effective amount of polyquaternary polymer in the formulation yields 2 rpm and 20 rpm Brookfield viscosity properties that help to inhibit pigment settling and syneresis issues in the slurry concentrate during the two week aging period while also ensuring the good pumpability of the aged product concentrate. In terms of target Brookfield viscosities, the high solids anti-tack formulations will have an initial 2 rpm Brookfield Viscosity of 5,000-25,000 cps, but more preferably a 2 rpm Brookfield Viscosity of 10,000-20,000 cps, to insure that the formulation is viscous enough to keep all the pigmentation well suspended in the liquid concentrate and to inhibit syneresis during product storage. The formulation will increase in viscosity as it ages and will form a thixotropic gel whereby its preferred two week aged, 2 rpm Brookfield Viscosity should be less than 150,000 cps to insure that the product can be readily pumped. From a dynamic viscosity standpoint, it is desirable that the 20 rpm Brookfield Viscosity of the formulation after two weeks of aging should be less than 25,000 cps and more preferably be less than 20,000 cps.

3) An effective amount of polyquaternary cationic polymer is employed in the high solids anti-tack formulation so as to impart an effective level of anti-microbial activity to help extend the shelf life of the product or to potentially eliminate the need for adding other optional biocides.

4) The dosage of polyquaternary cationic polymer that is employed in the high solids talc based anti-tack formulation has an impact on its process viscosity and overall processability during the high-shear dispersion process. Hence, an effective amount of polyquaternary polymer in the formulation yields the above flocculation, viscosity and anti-microbial properties while simultaneously enabling the formulation to be processed using conventional single shaft or dual shaft high-shear dispersers at total % solids contents of at least 45% and more preferably at % solids contents greater than 50%. Higher than required levels of polyquaternary cationic polymer usage will result in excessive talc particle flocculation that translates to poor batch processability and it can also result in undesirable side reactions with the alkali metal fatty acid soaps which are anionic. It should also be noted that the effective amount of polyquaternary polymer is preferably added to the formulation's batch water in pre-dissolved form prior to the addition of the talc pigmentation to facilitate the polymer treatment process without causing excessive flocculation during make-down of the overall slurry batch.

With regards to the low solids dip slurry product of 1%-10% solids, that is more preferably 2%-6% solids, and most preferably 3%-4% solids, which is produced from the high solids concentrate of 45%-75% solids via dilution with water, the amount of polyquaternary cationic polymer that is employed in the making of the concentrate formulation ultimately translates to functional end-use performance benefits in an uncured rubber coating application like a dip slurry application. Hence, in a low solids dip slurry application, an effective amount of polyquaternary polymer, such as PolyDADMAC, needs to be present for the following reasons:

1) An effective amount of polyquaternary polymer is needed in the low solids dip slurry in order to prevent hard pack settling of the talc pigmentation. The effective amount of polyquaternary polymer results in the creation of soft or fluffy wet sediments of talc whereby the associated RSV of the wet sediment is equal to or greater than 35 cm$^3$ when measured in a 1 liter graduate cylinder from a 4% solids dip slurry contained therein that has been allowed to statically settle for 24 hours.
2) An effective amount of the polyquaternary cationic polymer is needed in the low solids, anti-tack dip slurry in order to improve the coating coverage of a 4% solids talc based dip formulation that is dip coated onto an uncured rubber compound slab for the purposes of improving the resultant anti-tack properties of the applied coating film on the surface of the uncured rubber slab to an anti-tack performance rating of at least 3 or preferably higher. A more detailed explanation of the anti-tack performance rating of dip coated uncured rubber compounds, which ranges from a low anti-tack performance rating of 0 (whereby a 0 rating equates to "fail") to a maximum anti-tack performance rating of 6 (whereby a 6 rating equates to "excellent"), will be provided later on in Example 3.

In a more preferred embodiment, the water soluble cationic polymer, e.g., PolyDADMAC, will be employed at active basis dosage levels equal to or less than 0.25% by weight of the total formulation or more preferably be employed at active basis dosage levels equal to or less than 0.10% by weight of the total formulation.

In addition to all the aforementioned performance benefits imparted from PolyDADMAC being added at very low active basis dosage levels the PolyDADMAC, being a cationic polyquaternary polymer, may also inherently help to mitigate microbial growth in the anti-tack formulation as the antimicrobial activity of cationic polyquaternary polymers has been previously reported in the technical literature; see for example A. M. Carmona-Ribeiro, et. al., International J. of Molecular. Sci., 2013, 14, pp. 9906-9946. This reported anti-microbial activity may extend the shelf life of the formulation or it may even obviate the need for using other biocide additives under certain storage conditions so this is another potential benefit associated with the use of a cationic polyquaternary polymer in the talc based anti-tack formulation.

Another aspect of the invention relates to the method of making the anti-tack formulation using the polyquaternary cationic polymer, one or more sizes of talc, and additives such as nonionic surfactants, anionic soaps, suspension aids, defoamers, and biocides. The various components are mixed together in various increments and order to ultimately form the inventive anti-tack formulation. While the order of adding the various components can vary as well as adding incremental amounts to obtain the desired concentrations, with regards to combining the cationic polymer and talc, the preferred mixing approach is to first add the cationic polymer in pre-dissolved aqueous form (which is about 7.0-7.5% active basis polymer) to the formula's starting batch water and then begin adding the dry talc thereafter in stages under high shear mixing conditions with intermittent additions of nonionic surfactant and alkali metal fatty acid soap to help wet and disperse the talc particles into a homogeneous slurry formulation. Along the course of this high-shear dispersion process, other chemical process additives such as suspension aides, defoamers, and biocides can also be incorporated to yield the final anti-tack formulation. A representative high-shear dispersion process scheme is outlined in Process Scheme 1 of Table III, which is detailed and discussed in Example 1 below. In contrast, adding the pre-dissolved water soluble cationic polymer, e.g., PolyDADMAC, solution at latter stages of the overall talc dispersion process can typically result in unmixable gels being quickly produced. The pre-dissolved solution of water soluble cationic polymer, e.g., PolyDADMAC, (at 7.0-7.5% solids content) that is used in the disclosed process of making is easily produced from dry water soluble cationic polymer, e.g., PolyDADMAC, beads by mixing them into soft, neutral pH water using an IKA Ultra-Turrax rotor/stator disperser. No detectable degradation in the molecular weight of the water soluble cationic polymer occurs when employing the Ultra-Turrax disperser at moderate mix shear rates while targeting a finished solids content of 7.0-7.5% for the water soluble cationic polymer, e.g., PolyDADMAC, solution. While it is possible that PolyDADMAC products which are commercially available in high solids content aqueous form (e.g., at 30-50% solids) from the polymer manufacturers may be employed in the inventive process by adjusting for their polymer actives content difference, many of these products contain their own surfactant packages that have to be considered and accounted for when formulating the desired anti-tack formulation. Given these additional considerations and the criticality of employing the right surfactants in the anti-tack formulation, it is preferred to obtain the PolyDADMAC in dry form and then pre-dissolve it in water for subsequent formulation use.

As noted above, the high solids talc based anti-tack formulations of the invention are comprised of three essential ingredients: a fine particle size talc, a polyquaternary cationic polymer and a surface active wetting agent package whereby the wetting agent package can consist of just intermediate HLB nonionic surfactant(s) (one or more types), or just anionic alkali metal, saturated or unsaturated, $C_8$-$C_{20}$ fatty acid soap(s)(one or more types), or preferably will contain combinations of these two classes of surface active wetting agents whereby one or more intermediate HLB nonionic surfactants are combined with one or more anionic alkali metal, saturated or unsaturated, $C_8$-$C_{20}$ fatty acid soaps. Also as mentioned above, another optional ingredient in the inventive anti-tack formulation is suspension aide additives. Useful suspension aide additives in the anti-tack formulation can include but are not limited to fumed silica, xanthan gum, sepiolite, smectite clays such as bentonite and hectorite, attapulgite and carboxy methyl cellulose. The optional amount of suspension aide potentially employed is highly dependent on the total % solids of the anti-tack formulations which can vary from a solids content of 45%-75% but the anti-tack formulations more preferably have a % solids content greater than 50%. The total combined amount of suspension aide that is employed is also highly dependent on which combination of one or more suspension aides is employed as the relative effectiveness and associated viscosity build from each suspension aide additive is different.

In the lower end of the total % solids range (from 45%-50% solids) a higher dosage level of suspension aide additive is commonly employed in the anti-tack formulation in order to help prevent pigment settling and/or to eliminate syneresis issues in the concentrate formulation. At a total solids content of 45%-50%, the combined amount of suspension aides that is typically utilized falls into the additive range of 1.0-2.0% by weight of the total formulation. In contrast, at a total solids content of 50%-55% the combined amount of suspension aides that is typically utilized falls into the additive range of 0.2-1.0% by weight of the total formulation. Lastly, at a total solids content greater than 55% the combined amount of suspension aides that is typically utilized falls into the additive range of 0.0-0.2% by weight of the total formulation as little to no suspension aide is required to minimize pigment settling and/or to prevent syneresis behavior. Thus, an overall range for the suspension aid, if used would be from zero to 2.0% by weight.

The various defoamer additives that have been discussed as components of the talc based anti-tack formulation (e.g., an oil based defoamer, n-butyl stearate and tributyl phosphate) are also optional additives. The use of defoamers is highly dependent on the type of surface active wetting agent package that is being employed and the total amount of wetting agent that is present in the anti-tack formulation. The alkali metal, saturated or unsaturated, $C_8$-$C_{20}$ fatty acid soaps are typically more foamy than many of the nonionic surfactants so the addition of some defoamer may be required to keep a dip slurry foam, for example, in check if soaps are utilized. In contrast, some low EO content nonionic surfactants and some of the alkoxylated EO/PO nonionic surfactants or select EO/PO block copolymer nonionic surfactants of intermediate HLB value are commonly very low foaming surfactants hence the need for using defoamer may be minimized or eliminated. Lastly, the addition of fumed silica as a suspension aide frequently helps to lower foam in the low solids dip slurries as well by acting as a particulate based bubble buster hence the need for using defoamer may be further minimized or eliminated. So in summary, the total amount of foam seen in the low solids dip slurries that are derived from the high solids anti-tack formulations via dilution is dependent on the types and amounts of wetting agent(s) employed so defoamer additives are accordingly employed as needed to keep the dip slurry foam as low as practically possible. It is also prudent to utilize as little defoamer as possible in controlling dip slurry foam because excessive usage of defoamers, particularly the oil based defoamers, can begin to effect the quality and coverage of the anti-tack dip coating that is being applied to the uncured rubber compound. Furthermore, it is generally not recommended to use any silicone (polysiloxane) based defoamer additives in the inventive anti-tack formulations. While silicones are very effective defoaming agents, their use can permanently effect the adhesion properties of the final rubber compound so most rubber compounder's prohibit their use.

The anti-tack formulations of the invention utilize talc particles having a median particle size of about 7 microns or less (as measured with a Cilas particle size analyzer) and more preferably having a median particle size of about 3 microns or less. In a highly preferred case, the talc pigmentation used in the inventive anti-tack formulation is a blend of two different sized talc particles, wherein the smaller median particle size is at least two microns less than the larger median particle size. For example, the talc particles could combine a 5 micron median particle size with one that is 3 microns or less. A more preferred combination of talc particles is a 3 micron median particle size (mps) talc and a 1 micron mps talc. The relative weight of the mix of talc particles is one where the larger size particles are greater in weight amount than the smaller size talc particles. The relative active basis weight ratio of larger talc to smaller talc can range from about 1.5:1 to 9:1. When using a combination of 3 and 1 micron mps talc particles, a preferred active basis weight ratio of 3 micron mps talc to 1 micron mps talc can range from about 2.5:1 to 4:1. The utilization of some 1 micron mps talc in the inventive formulation is desirable because its higher surface area translates to improved coating coverage of the uncured rubber compound. Two representative examples of commercial talc pigments that are particularly useful in the inventive formulation are SAS-3 Talc (Cilas mps=3.0 microns) and FlexTalc 610 (Cilas mps=1.0 micron) which are both available from Cimbar Performance Minerals. Both of these pigments are dry ground grades of talc that have been subjected to intensive grinding and classification. Furthermore, the SAS-3 and FlexTalc 610 talc pigments are produced from high quality ores that contain a minimum amount of mineral impurities such as crystalline silica. These pigments therefore help to meet the OSHA occupational exposure requirements discussed above.

Beyond the coating coverage aspects that the inventive anti-tack formulation provides (as discussed above), the utilization of fine particle size talc pigments in the inventive formulations is also preferred because they are more easily reincorporated into the rubber compounds in subsequent rubber product manufacturing steps. Anti-tack coating formulations are applied to uncured rubber compounds to reduce their tackiness. They serve as process aides to enable the rubber compounder to temporarily stack or more easily move compounded rubber to other operations where the rubber will ultimately be cured and molded into its finished product form. In these subsequent manufacturing steps, the compounder wants all of the compound's adhesion properties to be unaffected so as to yield good rubber to rubber or rubber to metal adhesion properties. It is therefore essential that the anti-tack coating be effective on the rubber compound's surface for a short period of time but then be easily reincorporated back into the compound later on such that final adhesion properties in the cured/molded product are not adversely affected. Being effective anti-block pigments, it is therefore preferable that the talc particles be small in size to aide their ease of reincorporation.

In terms of their desired viscosity, the inventive talc based anti-tack formulations have an initial 2 rpm Brookfield Viscosity of 5,000-25,000 cps, but more preferably a 2 rpm Brookfield Viscosity of 10,000-20,000 cps, in order to insure that the formulation will be viscous enough to keep all the pigmentation well suspended in the liquid concentrate and to inhibit syneresis during product storage. Typically, the inventive anti-tack formulation will increase in viscosity as it ages and will form a thixotropic gel. From an aged viscosity standpoint, it is preferred that the two week aged, 2 rpm Brookfield Viscosity of the formulation should be less than 150,000 cps to insure that the product can be readily pumped from totes or other shipping containers using a positive displacement type pump such as an air diaphragm pump, a rotary lobe pump, a progressive cavity pump or the like. Such positive displacement type pumps have the ability to overcome the aged product's rheological yield point so as to transform the gel into a pumpable fluid. From a dynamic viscosity standpoint, it is desirable that the 20 rpm Brookfield Viscosity of the inventive formulation after two weeks of aging be less than 25,000 cps and more preferably be less than 20,000 cps.

Given the measurement of both 2 rpm and 20 rpm Brookfield Viscosities for the inventive formulation, it is important to understand why these specific measurements are being made and why value ranges for each are being defined. The Brookfield 2 rpm measurement is being made to determine the viscosity of the formulation under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. For 20 rpm, the dynamic viscosity of the formulation is measured in its flowable state as opposed to the viscosity reading at 2 rpm whereby the product is being measured in its non-flowing "static" gel state. Readings at both shear rates are consequently needed in order to more fully understand the overall rheological properties of the inventive anti-tack formulation.

In terms of processing equipment to produce the inventive anti-tack formulations, various types of high-shear mixing equipment can be potentially employed to disperse the talc at high slurry solids contents. One preferred type of high-shear mixing device is a single shaft, high speed disperser employing a Cowles, cutting-style disperser blade. Multi-shaft dispersers can also be employed with good results and are highly preferred. For example, dual shaft mixers equipped with a center shaft mounted low speed helical wall scrapper type blade in combination with an offset shaft mounted high speed disperser are very advantageous to employ in terms of the range of anti-tack formulations that can be easily produced. A representative example of such a dual shaft disperser system that is suitable for production use is manufactured by Hockmeyer. In comparison, the inventive anti-tack formulations produced with a single shaft disperser often require higher weight %'s of surfactant to be employed in the formula to help mediate the high-shear process viscosity associated with dispersing the talc and keeping the resultant dispersion of flocculated talc particles fluid. Using higher levels of surfactant can accordingly result in more process foam being generated which must then be dealt with through the employment of defoamer additives. In addition, using higher levels of surfactant in the anti-tack formulation can subsequently reduce the amount of wet sediment RSV that is obtained in the diluted dip slurry of 3-4% solids content. In summary, multi-shaft dispersers can often produce effective anti-tack formulations of lower cost by reducing the amount of surfactant that is required for dispersion.

Lastly, while the main object of the invention is to produce effective anti-tack formulations for rubber slab dip applications that are predominantly talc-based formulations, it also well recognized to one skilled in the art that related formulations can be produced whereby small portions of the total talc pigmentation can be effectively replaced with other anti-block pigments to tailor the final performance properties of the anti-tack product. Examples of suitable replacement pigments for a portion of the talc include but are not limited to kaolinite, calcined kaolin clays, smectite clay minerals such as bentonite and hectorite, attapulgite, sepiolite, barytes, nepheline syenite, calcium carbonate (ground or precipitated forms), dolomite, fine particle micas consisting of muscovite or phlogopite, feldspars, synthetic amorphous silica pigments such as precipitated silica and fumed silica, alumina trihydrate, hydrotalcite and various metal stearate pigments such as calcium stearate, magnesium stearate and zinc stearate. Example formulations are disclosed and characterized whereby about 21% by weight of the total dry basis talc content was successfully replaced with an alternative anti-block pigment as discussed below in Example 3. In this example, the larger 3 micron mps talc was selectively replaced with the alternative anti-block pigment such that the weight ratio blend of 3 micron mps talc to 1 micron mps talc in the formulation was effectively reduced from 4:1 to 2.9:1.

Testing was performed relating to the invention and the various characteristics of the inventive anti-tack formulation. Example I of this testing relates to an exemplary composition of the inventive anti-tack formulation with a high solids content and its particle size distribution. Also examined in the testing relating to Example 1 are the properties of the fine particle tales used in the formulation and the physical properties of the high solids content anti-tack formulation. Example 2 investigates the viscosity characteristics of formulations related to Example 1 to determine their pumping capability. Example 2 also formulates a 4% solids content dip slurry to investigate the foaming properties, sedimentation properties, and the anti-tack coating properties on uncured rubber. Example 3 investigates a composition similar to that used in Example 1 but with substitute anti-block pigments in place of the larger 3 micron mps talc. Example 3 also investigates physical properties of the high solids content formulations and properties of the dip slurry in terms of foaming, sedimentation, and anti-tack coating properties on uncured rubber. Example 4 is similar to Example 3 but makes changes in the amounts of alkali metal fatty acid soap and of nonionic surfactant that are employed to investigate their effects on the dip slurry properties of the inventive anti-tack formulation.

Example 1

Table I summarizes the composition for two different talc-based anti-tack formulations that were produced on a production scale of 3,600 lbs. using different types of high-speed dispersers.

TABLE 1

Compositional Summary for Anti-Tack Talc Formulations A & B[c]

| Chemical Tradename/ Supplier | Chemical Name | Properties & Functionality of Ingredient | CAS # | Talc Anti-Tack Formula A Method: Single Shaft High-Speed Disperser Wt. in Production Batch, lbs. | Wt. % in Formula | Talc Anti-Tack Formula B Method: Dual Shaft High-Speed Disperser with Wall Scrapper Wt. in Production Batch, lbs. | Wt. % in Formula |
|---|---|---|---|---|---|---|---|
| Soft Water | Dihydrogen Oxide | Solvent Phase | 7732-18-5 | 1,708.43 | 47.45% | 1,575.59 | 43.77% |
| Talc SAS-3/Cimbar Performance Minerals | Talc; Magnesium Silicate Hydrate | Anti-Block Pigment (3 micron median p.s.)[a] | 14807-96-6 | 1,350.00 | 37.50% | 1,530.00 | 42.50% |
| FlexTalc 610/ Cimbar Performance Minerals | Talc; Magnesium Silicate Hydrate | Anti-Block Pigment (1 micron median p.s.) | 14807-96-6 | 340.00 | 9.44% | 378.00 | 10.50% |
| Ethal TDA-5/Ethox Chemicals | PEG-5 Tridecyl Ether; Trideceth-5 | Interfacial Wetting (pigment & rubber); Nonionic Surfactant with HLB = 10.4 | 24938-91-8 | 66.60 | 1.85% | 20.70 | 0.58% |
| Norfox 92/Norman, Fox & Co. | Sodium Tallowate Soap | Interfacial Wetting (pigment & rubber) | 8052-48-0 | 39.00 | 1.08% | 39.00 | 1.08% |
| ValPro 59/Vanguard Soap | Blend of Sodium Vegate + Sodium Cocoate Soaps | Interfacial Wetting (pigment & rubber) | 68082-64-4 & 61789-31-9 | 27.60 | 0.77% | 20.40 | 0.57% |
| Konasil 200/OCl | 200 $m^2$/g Fumed Silica; Synthetic Amorphous Silicon Dioxide | Pigment Suspension, Foam Control & Anti-Block | 7631-86-9 | 21.60 | 0.60% | — | — |
| DEE FO 3010A/ Munzing Chemie | Petroleum distillates, blend of light & heavy paraffinic oils | Oil based Defoamer | 64742-56-9 & 64742-65-0 | 11.00 | 0.31% | 10.80 | 0.30% |
| Xanthan Gum/ Global Ingredients | Xanthan Gum Polysaccharide | Pigment Suspension Aide | 11138-66-2 | 9.40 | 0.26% | 6.12 | 0.17% |
| n-Butyl Stearate/ Custom Synthesis, LLC | n-Butyl Stearate | Pigment Wetting & Defamer | 123-95-5 | 7.20 | 0.20% | 7.20 | 0.20% |
| PhosFlex 4/ICL Industrial Products | Tri-n-butyl Phosphate | Defoamer | 126-73-8 | 7.20 | 0.20% | — | — |
| Pangel W/Tolsa Group | Sepiolite; Hydrous Magnesium Silicate | Pigment Suspension Aide | 63800-37-3 | 3.60 | 0.10% | 3.60 | 0.10% |
| PDMBL Series/ Isomeric Industries | PolyDADMAC; Polydiallyldimethyl Ammonium Chloride (Mw = 493,000 Da)[b] | Water Soluble Cationic Polymer; Pigment Flocculating Agent | 26062-79-3 | 3.37 | 0.09% | 3.37 | 0.09% |
| BSC 3243/Bulk Chemical Services | Dazomet; Tetrahydro-3,5-dimethyl-2H-1,3,5-thiadiazine-2-thione | Biocide | 533-74-4 | 2.70 | 0.075% | 2.70 | 0.075% |
| BCS 3502A/Bulk Chemical Services | Glutaraldehyde | Biocide | 111-30-8 | 2.20 | 0.06% | 2.16 | 0.06% |
| Surfynol 440/ | PEG-3.5 2,4,7,9- | Interfacial | 9014-85-1 | 0.40 | 0.01% | 0.36 | 0.01% |

TABLE 1-continued

Compositional Summary for Anti-Tack Talc Formulations A & B[c]

| Chemical Tradename/ Supplier | Chemical Name | Properties & Functionality of Ingredient | CAS # | Talc Anti-Tack Formula A Method: Single Shaft High-Speed Disperser | | Talc Anti-Tack Formula B Method: Dual Shaft High-Speed Disperser with Wall Scrapper | |
|---|---|---|---|---|---|---|---|
| | | | | Wt. in Production Batch, lbs. | Wt. % in Formula | Wt. in Production Batch, lbs. | Wt. % in Formula |
| Evonik | tetramethyl 5 decyn-4,7-diol | Wetting (pigment & rubber); Nonionic Surfactant with HLB = 8.0 | | | | | |
| | | | Totals = | 3600.30 | 100.00% | 3600.00 | 100.00% |

Notes:
[a]Median particle size of the Talc was determined using a Cilas 990L Particle Size analyzer. The talc pigments were initially wetted in a 50% w/w aq. solution of Isopropanol and then subsequently dispersed into the analyzer's test chamber water which contained sodium hexametaphosphate as a dispersant.
[b]The Mw of the cationic polymer was determined by Jordi Labs of Mansfield, MA using Tetra-Detection Gel Permeation Chromatography (GPC-T).
[c]Target physical properties for these production scale runs are summarized in Table IV.

The anti-tack Formula A of the invention was produced using a 50 HP high speed, single-shaft disperser unit equipped with a Cowles cutting-style dispersion blade. The talc pigmentation used in Formula A is a blend of a 3 micron median particle size talc (Cimbar SAS-3) and a 1 micron median particle size Talc (Cimbar FlexTalc 610) whereby the preferred relative active basis weight ratio of 3 micron mps Talc to 1 micron mps talc is about 4:1. The stated median particle sizes of the SAS-3 and FlexTalc 610 starting materials are defined on the basis of their analysis with a Cilas 990 L laser particle size analyzer. Both of these talc pigments are dry ground grades of talc that have been subjected to intensive grinding and classification and they are produced from high quality ores that contain a minimum amount of mineral impurities such as crystalline silica. Other typical physical properties associated with these preferred fine particle size Talc pigments are summarized in Table 11.

TABLE II

Comparative Typical Properties of Fine Particle Talc Pigments

| Property | SAS-3 Talc | FlexTalc 610 |
|---|---|---|
| Wt. % Passing 325 Mesh | 99.9 | 99.9 |
| Median Particle Size (Cilas PSD 50%)[1], microns | 3.0 | 1.0 |

TABLE II-continued

Comparative Typical Properties of Fine Particle Talc Pigments

| Property | SAS-3 Talc | FlexTalc 610 |
|---|---|---|
| % Free Moisture | 0.2 | 0.3 |
| Cie Lab L* | 97.0 | 98.5 |
| pH at 10% solids[3] | 8.9 | 8.9 |
| Total Crystalline Silica Content[2], Wt. % | 0.27 | 0.40 |

Notes:
[1]Median particle size of the talc was determined using a Cilas 990 L Laser Particle Size analyzer. The talc pigments were initially wetted in a 50% w/w aq. solution of Isopropanol and then subsequently dispersed into the analyzer's test chamber water which contained sodium hexametaphosphate as a dispersant.
[2]Total crystalline silica content was determined by R J Lee Group using XRD via the NIOSH 7500 analysis method. Values reported reflect the historical average of lots periodically checked over a 3 year time frame.
[3]Talc pigments were dispersed in pH neutral soft water at 10% solids for pH measurement at 25° C.

Employing the high speed disperser a high-shear mixing process is employed whose stepwise additions are outlined in Process Scheme 1, which is shown in Table III.

TABLE III

Process Scheme 1
PRODUCT: Talc Anti-Tack Formulation A
BATCH SIZE: 3,600 #
50 HP Single Shaft High-Speed
Disperser Equipped with a Cowles
EQUIPMENT: Dispersion Blade
PROCESS STEPS Special Instructions: All Talc (SAS-3 and FT610) are added through the screw conveyor addition system. All other powder additives are added over the side of the dispersion tank.
1. PreBlend: Using a Gast Air Mixer at ~40 PSI, begin mixing Ethal TDA-5 (warm; 95° F.) in a 5 gallon pail using a 5" type 3 prong turbine blade then slowly add xanthan gum into vortex. Scrape sides with a spatula & mix well. Leave preblend mixing until needed at Step No. 42.
   a) ETHAL TDA-5 (warm; 95° F.) = 16.2 #
   b) Xanthan Gum = 9.4 #
2. Lower disperser to lowest mix position.
3. Fill 375 gallon baffled SS tank with 1,665 # soft water @25-30° C.
4. Turn Ross Disperser on to 30 Hz.

TABLE III-continued

Process Scheme 1
PRODUCT: Talc Anti-Tack Formulation A
BATCH SIZE: 3,600 #
50 HP Single Shaft High-Speed
Disperser Equipped with a Cowles
EQUIPMENT: Dispersion Blade
PROCESS STEPS 5   Dazomet Biocide (BCS 3243) = 2.7 #
6   7.2% active PolyDADMAC aq. solution = 46.8 #
7   Surfynol 440 surfactant = 0.4 #
8   Sepiolite (Pangel W) = 3.6 #
9   Munzing DE FOO 3010A defoamer = 5.5 #
10  Norfox 92 Soap = 39 #
11  ETHAL TDA-5 (warm; 95° F.) = 5.4 #
12  Disperse batch for 2 minutes. Check & record pH
13  Increase Ross Disperser mix speed to 60 Hz.
14  SAS-3 Talc = 450 # --- Feed at 1 bag/min rate via screw conveyor.
15  Valpro 59 soap flakes = 3 #
16  ETHAL TDA-5 (warm; 95° F.) = 1.8 #
17  Fumed silica (Konasil 200) = 9 #
18  Raise position height of dispersion blade to aide mixing & disperse for 3 min.
19  SAS-3 Talc = 450 # --- Feed at 2 bags/min rate via screw conveyor.
20  Valpro 59 soap flakes = 3 #
21  ETHAL TDA-5 (warm; 95° F.) = 1.8 #
22  Disperse for 2 minutes.
23  SAS-3 Talc = 350 # --- Feed at 2 bags/min rate into screw conveyor.
24  Valpro 59 soap flakes = 9 #
25  ETHAL TDA-5 (warm; 95° F.) = 12.6 #
26  Disperse for 5 minutes. Scrape down walls during mix time.
27  FlexTalc 610 = 150 #
28  n-Butyl Stearate (warm; 95° F.) = 7.2 #
29  Valpro 59 soap flakes = 6 #
30  ETHAL TDA-5 (warm; 95° F.) = 14.4 #
31  Disperse for 2 minutes.
32  FlexTalc 610 = 100 #
33  Valpro 59 soap flakes = 3 #
34  ETHAL TDA-5 (warm; 95° F.) = 14.4 #
35  Scrape down walls & tank baffles then disperse for 3 minutes.
36  FlexTalc 610 = 90 #
37  SAS-3 Talc = 100 #
38  Valpro 59 soap flakes = 3.6 #
39  Glutaraldehyde biocide = 2.2 #
40  Konasil 200 (fumed silica) = 12.6 # --- Add slowly to avoid exceeding max. motor amps
41  Adjust height of dispersion blade to aide incorporation of fumed silica & disperse for 3 minutes.
    Scrape down walls during mix time.
42  Add PreBlend (from Step No. 1) = 25.6 #
43  Disperse for 3 min.; check screen & mix longer if needed to achieve clear screen.
44  Adjust Ross Disperser to 45 Hz for adding the defoamers below.
45  Munzing DEE FO 3010A defoamer = 5.5 #
46  PhosFlex 4 (Tributyl Phospate) defoamer = 7.2 #
47  Scrape down walls & baffles, then disperse for 3 min. Screen check batch. Screen must be clear
    before checking pH.
48  Check & record pH. Typical pH = 9.4-9.8 @ 40° C.
49  If batch pH is <9.40 @ 40° C. then dose in 22.5% active KOH as needed to adjust pH to target
    range of 9.40-9.80 @ 40° C. Let batch mix at least 3 min. in between successive pH adjustments.
50  If batch pH is >9.80 @ 40° C. then dose in 2-Ethylhexanoic Acid as needed to adjust pH down to
    target range of 9.40-9.80 @ 40° C. Let batch mix at least 3 min. in between successive pH
    adjustments.
51  If pH adjustments are made (per Steps 49 or 50) then screen check batch before concluding run.
    Mix extra time as needed to yield clear screen check.
52  Pull batch sample for QC Lab.

Target Specific Gravity (@ 25° C.) = 1.39 ± 0.10;
Target Solids (@ 150° C.) = 52.0 ± 1.0%;
Target QC pH = 9.40-9.90 @ 25° C.;
Initial BF Visc. (Sp #91 @ 2 rpm) = 10,000-20,000 cps;
Conductivity (@ 25° C.) = 0.7-4.7 mS/cm In accordance with Process Scheme 1, the preferred means of bringing together the PolyDADMAC polymer and the Talc particles is to first add the cationic polymer in pre-dissolved aqueous form (which is about 7.0-7.5% active basis polymer) to the formulation's starting batch water and then begin incrementally adding the dry talc thereafter in stages under high shear mixing conditions with intermittent additions of the nonionic surfactants (Surfynol 440 and Ethal TDA-5) and the alkali metal fatty acid soaps (Norfox 92 and Valpro 59) being employed along the way to help wet and disperse the talc particles. These intermittent additions of nonionic surfactants and anionic soaps help to keep the batch fluid enough and mixing well so that a homogeneous dispersion is ultimately produced. In addition, the other process additives such as the suspension aides (Konasil 200—fumed silica, xanthan gum and Pangel W—sepiolite), the defoamers (DEE FO 3010A—oil based defoamer, n-butyl stearate and PhosFlex 4—tributyl phosphate), and biocides (dazomet and glutaraldehyde) can be incorporated in at various intermediate stages of the overall dispersion process to yield the final anti-tack formulation. While dazomet and glutaraldehyde are exemplified, any biocides known to be used in anti-tack formulations can be used in the inventive anti-tack formulations. For example, another potentially suitable biocide for the inventive anti-tack formulation is BIT (1,2-benzisothiazolin-3-one; CAS #2634-33-5). Furthermore, it is believed that the PolyDADMAC being a cationic polyquaternary polymer may also inherently help to mitigate microbial growth in the formulation as the antimicrobial activity of cationic polyquaternary polymers has been previously reported in the technical literature. This anti-microbial activity may therefore extend the shelf life of the formulation or it may even obviate the need for using other biocide additives under certain storage conditions so this is another potential performance benefit associated with the use of a cationic polyquaternary polymer in the talc based anti-tack formulation.

In Formula A, the PolyDADMAC polymer is employed at a very low active basis amount of 0.09% by weight of the total formulation and the specific grade of PolyDADMAC employed in the process had an Mw value of 493,000 Daltons as determined by Tetra Detection Gel Permeation Chromatography (GPC-T). GPC-T couples a GPC separation with a light-scattering (LS) detector for absolute molecular weight determination and a viscometer for determination of polymer shape and radius of hydration (Rh). The use of an LS detector renders calibration standards unnecessary as the measurement is based on the way in which the sample scatters light and not on the retention time at which the molecule elutes as compared to standards. From this analysis the PolyDADMAC grade that was employed was also determined to have an Intrinsic Viscosity of about 10.0 dL/g.

The low level of PolyDADMAC employed in Formula A (0.09% by weight) is sufficient in quantity to moderately flocculate the Talc particles into loosely bound agglomerates while still yielding acceptable rheological properties for stability and for pumpability purposes. The initial 2 rpm and 20 rpm Brookfield Viscosities for Formula A as well as its other QC test properties are summarized in Table IV. The total solids content of Formula A was 52.2% by weight and its initial 2 rpm Brookfield Viscosity was 17,500 cps which is viscous enough to keep all the pigmentation well suspended in the liquid concentrate as it ages and to inhibit the occurrence of syneresis during product storage. In addition, the total crystalline silica content of Formula A was determined to be just 0.14% on the basis of XRD analysis determinations done on the individual raw material contributors and then summing up their respective contributions based on their usage levels in the total formulation.

In Formula A, the nonionic surfactants being employed are nonionic surfactants of intermediate HLB value as both reside within the HLB range of 6-12. The preferred nonionic surfactants are a combination of a PEG-5 tridecyl ether (Ethal TDA-5; HLB=10.4) plus a PEG-3.5 2,4,7,9-tetramethyl 5 decyn-4,7-diol (Surfynol 440; HLB=8.0). Both nonionic surfactants function to provide interfacial wetting between the talc and the elastomer surface. It should also be noted that the total amount of sodium fatty acid soaps (the ValPro 59 plus the Norfox 92) being employed in Formula A is low (total=1.85% by weight of the formulation). ValPro 59 is a blend of sodium vegate and sodium cocoate soaps whereas Norfox 92 is a sodium tallowate soap. One needs to minimize the amount of alkali metal fatty acid soaps being used in the inventive formulation because they are anionic surfactants which can have potential reaction interferences with the PolyDADMAC cationic polymer. At high concentration levels of PolyDADMAC cationic polymer and of the anionic fatty acid soaps some resultant reaction products arising from the ionic bonding of the cationic quaternary groups within the polymer with the anionic carboxylate groups associated with the fatty acid soap can undesirably occur. Such ionic reaction products between cationic polyelectrolytes and anionic surfactants are known in the prior art and they need to be avoided. Consequently, total alkali metal fatty acid soap contents should be maintained at levels of about 3.0% by weight of the total formulation or less and more preferably equal to or less than 2.0% by weight of the total formulation to minimize the potential for side reactions with the PolyDADMAC cationic polymer. These low levels of alkali metal fatty acid soap are still effective for providing good film forming properties on the uncured rubber substrate for aiding anti-tack coating performance while being low enough to also minimize the potential for any side reactions with the PolyDADMAC.

Similarly, the PolyDADMAC polymer dosage of 0.09% by weight of the total formulation is sufficiently low in amount to minimize the potential for any side reactions with the aforementioned alkali metal fatty acid soaps but that dosage level is still adequate to provide an effective degree of talc particle flocculation that significantly enhances end use dip slurry performance properties. Flocculation of the talc particles within Formula A is evident from an examination of its Horiba particle size distribution curve as compared to the particle size distribution curve determined for the starting 4:1 w/w blend of 3 micron to 1 micron talc pigments (see FIG. 1). The observed shift in particle size distribution is a consequence of the cationic polymer creating loosely bound agglomerates of the talc platelets. The net result of this agglomeration is about a 25% increase in the median particle size value (the Horiba mps increased from about 7.82 to about 9.81 microns).

The complete compositional details for Formula B are also summarized in Table 1. Formula B was produced via a high-shear mixing process in an analogous fashion to the slurry makedown protocol of Formula A but with some notable exceptions such as:

1) A dual-shaft Hockmeyer disperser was employed instead of a single shaft high speed disperser. The dual shaft disperser was equipped with a center shaft mounted low speed helical wall scrapper type blade in combination with an offset shaft mounted high speed disperser equipped with a Hockmeyer dispersion blade.
2) The same 3 micron mps and 1 micron mps talc pigments were employed at a 4:1 w/w ratio as before but the total solids content of the batch formula was higher and yielded 56.1% solids.
3) The amounts of Ethal TDA-5 surfactant and ValPro 59 soap used in Formula B were significantly reduced versus the amounts employed in Formula A. When comparing Formula A versus Formula B, the Ethal TDA-5 level has been reduced from 1.85 to 0.58 weight % while the level of ValPro 59 has been reduced from 0.77 to 0.57 weight %.
4) No fumed silica or Tri-n-butyl Phosphate defoamer were employed in Formula B.

When making Formula B, the preferred means of bringing together the PolyDADMAC cationic polymer and the Talc particles is to first add the cationic polymer in pre-dissolved aqueous form (which is about 7.0-7.5% active basis polymer) to the formula's starting batch water. Next, one begins to incrementally add in the dry talc in stages under high shear mixing conditions with intermittent additions of the nonionic surfactants (Surfynol 440 and Ethal TDA-5) and alkali metal fatty acid soaps (Norfox 92 and Valpro 59) being employed along the way to help wet and disperse the talc particles. These intermittent additions of surfactants and soaps help to keep the batch fluid enough and mixing well so that a homogeneous dispersion is ultimately produced. As shown in Table IV, the resultant batch produced from Formula B using the Hockmeyer dual-shaft disperser yielded an initial Brookfield Viscosity of 13,800 cps at 56.1% solids.

TABLE IV

Target Physical Properties of Anti-Tack Formulations A & B from Table I

|  | Talc Formula A | Talc Formula B |
|---|---|---|
| pH @ 25° C. | 9.8 | 10.2 |
| Conductivity @ 25° C., mS/cm | 2.46 | 2.42 |
| Initial BF Viscosity (Sp# 91 @ 2 rpm)[1], cps | 17,500 | 13,800 |
| Initial BF Viscosity (Sp# 91 @ 20 rpm)[1], cps | 3,900 | 3,330 |
| Specific Gravity[2] @ 25° C., g/ml | 1.39 | 1.39 |
| Solids Content[3], Wt. % | 52.2 | 56.1 |
| Total Crystalline Silica Content[4], Wt. % | 0.14 | 0.16 |

Notes:
[1]Brookfield Viscosities were measured using a Brookfield RVDVE Heliopath Viscometer Unit equipped with T-spindles run at 2 rpm and then 20 rpm; T-spindle A (#91) was employed.
[2]Specific Gravities were determined using a 100 ml specific gravity cup in accordance with ASTM D1475.
[3]% Solids were determined by the use of a halogen lamp based A&D Model MF-50 Moisture Balance using a temperature setting of 150° C.
[4]Total Crystalline Silica Contents were calculated by summing the contributions from the various contributing mineral sources in the formulation. The contents levels in each contributing source were determined by R J Lee Group using XRD via the NIOSH 7500 analysis method.

Using a PolyDADMAC dosage level of 0.09% by weight of the total formulation the Formula B batch showed a very similar shift in Horiba particle size distribution as did Formula A as a consequence of flocculating the 4:1 w/w Talc blend of SAS-3 and FlexTalc 610. The net change in particle size distribution observed (see FIG. 1) again equated to about a 25% increase in the median particle size value arising from the agglomerated talc species being formed (Horiba mps increased from about 7.82 to about 9.82 microns). However, a key advantage of using the Hockmeyer dual-shaft disperser was that lower amounts of surfactant and soap were required to handle the process viscosity which thereby required less defoamer to be used to keep the foam at an acceptable level. The Hockmeyer dual-shaft disperser therefore enables a more economical formula to be produced and its resultant initial Brookfield Viscosity was notably less than that for Formula A despite the reduction in the amounts of nonionic surfactant and alkali metal soap that were employed.

Example 2

In this Example, a series of talc based anti-tack formulations were all produced on a 5,300 gram lab scale using high-speed dispersers. As shown in Table V, the four anti-tack formulations are identified as Formulas C, D, E and F.

TABLE V

Physical Property Tracking Data[a] for Lab Batches of Talc Anti-Tack Formulations C, D, E & F

| Anti-Tack Formulation (% Solids[b] & Description) | Initial BF Viscosity, pH & Conductivity[c] | Aged BF Visc., pH & Cond. after Aging 3 Days | Aged BF Visc., pH & Cond. after Aging 7 Days | Aged BF Visc., pH & Cond. after Aging 14 Days |
|---|---|---|---|---|
| Formula C @ 52.2% Solids Description: Talc based Anti-Tack via Cowles Disperser; Lab Scale Equiv. to Formula A | Sp #91 BF @ 2 rpm = 18,000 cps BF @ 20 rpm = 4,140 cps pH = 9.64 Cond. = 2.61 mS/cm | Sp #91 BF @ 2 rpm = 52,100 cps BF @ 20 rpm = 9,630 cps pH = 9.72 Cond. = 2.85 mS/cm | Sp #92 BF @ 2 rpm = 75,200 cps BF @ 20 rpm = 12,400 cps pH = 9.59 Cond. = 2.78 mS/cm | Sp #92 BF @ 2 rpm = 84,600 cps BF @ 20 rpm = 15,760 cps pH = 9.46 Cond. = 2.53 mS/cm |
| Formula D @ 56.1% Solids Description: Talc based Anti-Tack via Dual-Shaft Disperser; Lab Scale Equiv. to Formula B | Sp #91 BF @ 2 rpm = 11,500 cps BF @ 20 rpm = 3,140 cps pH = 10.20 Cond. = 2.34 mS/cm | Sp #91 BF @ 2 rpm = 45,200 cps BF @ 20 rpm = 7,580 cps pH = 10.15 Cond. = 2.75 mS/cm | Sp #91 BF @ 2 rpm = 55,600 cps BF @ 20 rpm = 7,740 cps pH = 10.05 Cond. = 2.75 mS/cm | Sp #91 BF @ 2 rpm = 61,600 cps BF @ 20 rpm = 7,670 cps pH = 9.88 Cond. = 2.88 mS/cm |
| Formula E @ 52.1% Solids Description: Formula C via Cowles Disperser but no Poly-DADMAC was used | Sp #91 BF @ 2 rpm = 13,200 cps BF @ 20 rpm = 3,480 cps pH = 9.79 Cond. = 2.38 mS/cm | Sp #91 BF @ 2 rpm = 55,800 cps BF @ 20 rpm = 10,820 cps pH = 9.71 Cond. = 2.41 mS/cm | Sp #92 BF @ 2 rpm = 74,200 cps BF @ 20 rpm = 14,580 cps pH = 9.55 Cond. = 2.41 mS/cm | Sp #92 BF @ 2 rpm = 107,600 cps BF @ 20 rpm = 17,680 cps pH = 9.46 Cond. = 2.35 mS/cm |
| Formula F @ 54.2% Solids Description: Commercial Talc based Pellet Lube; Tradename = Pellet Lube F3 | Sp #91 BF @ 2 rpm = 13,000 cps BF @ 20 rpm = 3,330 cps pH = 10.25 Cond. = 4.84 mS/cm | Sp #91 BF @ 2 rpm = 58,200 cps BF @ 20 rpm = 8,270 cps pH = 10.32 Cond. = 5.21 mS/cm | Sp #92 BF @ 2 rpm = 70,700 cps BF @ 20 rpm = 9,540 cps pH = 10.22 Cond. = 5.44 mS/cm | Sp #92 BF @ 2 rpm = 90,600 cps BF @ 20 rpm = 10,860 cps pH = 10.12 Cond. = 5.33 mS/cm |

Notes:
[a]Test batches were all aged at room temperature (20-25° C.). Properties were all determined at 25° C. Brookfield Viscosities were measured using a Brookfield RVDVE Heliopath Viscometer Unit equipped with T-spindles run at 2 rpm and then 20 rpm; T-spindles A (#91) & B (#92) were used as required.
[b]% Solids values were determined by the use of a halogen lamp based AND Model MF-50 Moisture Balance using a temperature setting of 150° C.
[c]All pH values were determined at 25° C. using an Oakton pH 450 meter. Conductivity values were determined at 25° C. using an Oakton CON 700 conductivity/TDS meter.

Batch Formulas C and D in Table V are identical in composition to Formulas A and B, respectively, as described above in Example 1 except the total batch size has now been reduced to a 5,300 gram lab scale. Formulas C and D will serve as comparative lab controls in this example. The composition of batch Formula E is based on Formula C except the PolyDADMAC polymer addition was intentionally left out in order to illustrate the differences in the resultant properties and performance without the cationic polymer being employed. All other ingredient amounts remained unchanged versus Formula C.

Batch Formula F is based on the commercial recipe for Pellet Lube F3 which is a conventional anti-tack for coating uncured rubber pellets at higher application solids of 10-18%. Pellet Lube F3, which is manufactured by SASCO Chemical Group/PSG, is principally comprised of a 3 micron median particle size talc (Cimbar SAS-3) plus sodium fatty acid soaps and a small amount of bentonite clay as a suspension aide. The Pellet Lube F3 formulation does not employ any polymeric additives such as PolyDADMAC. Commercial batches of Pellet Lube F3 typically have a solids content of about 54% and a pH of about 10 as produced. Formulas C, E and F were produced using a high speed, single-shaft lab disperser unit equipped with a Cowles cutting-style dispersion blade whereas Formula D was produced with a dual shaft lab-scale disperser. The overall method of making Formulas C, D and E was analogous to the stepwise pigment addition scheme previously outlined in Process Scheme 1 (Table 111) wherein the nonionic surfactants and anionic soaps are intermittently incorporated to keep the batch fluid and well mixed during the course of the slurry dispersion process.

Batch Formulas C, D, E and F were fully characterized and their respective physical properties were then rechecked over a period of 2 weeks. The physical properties tracked over the 2 week aging period are summarized in Table V. Properties that were monitored include Brookfield Viscosity values determined at 2 rpm and 20 rpm, pH and Conductivity. All four batches had a solids content greater than 50% and yielded an initial Brookfield 2 rpm viscosity between 10,000-20,000 cps. All the talc-based formulations were therefore stable with respect to showing no pigment settling and showing no observed syneresis during the 2 week aging period. After aging for 2 weeks at room temperature (20-25° C.) all four batches had a 2 rpm Brookfield Viscosity less than 150,000 cps and also had a 20 rpm Brookfield Viscosity less than 20,000 cps. Their aged Brookfield Viscosity values are acceptable and are indicative of formulations that can be readily pumped from totes or other shipping containers using a positive displacement type pump such as an air diaphragm pump, a rotary lobe pump, a progressive cavity pump or the like. Such positive displacement type pumps have the ability to overcome the aged product's rheological yield point so as to transform it into a pumpable fluid. At 20 rpm, the dynamic viscosity of the formulation is being measured in its flowable state whereas the viscosity reading at 2 rpm is one where the product is being measured in its non-flowing "static" gel state.

In Table VI, the dip performance properties of Formulas C, D, E and F are critically compared whereby each formula was transformed via dilution with water into slab dip slurries of 4% solids content for end use application testing.

TABLE VI

| Slab Dip Performance Testing of Talc Based Anti-Tacks at 4% Dip Slurry Solids | | | | |
|---|---|---|---|---|
| Formula ID | Talc Formula C | Talc Formula D | Talc Formula E | Talc Formula F |
| Product Description | Talc based Anti-Tack via Cowles Disperser | Talc based Anti-Tack via Dual-Shaft Disperser | Formula C via Cowles Disperser but no PolyDADMAC | Pellet Lube F3 (talc Based pellet lube) |
| Foam Properties for Dip Slurries[1] | | | | |
| Initial Foam Height, mm | 83 | 79 | 113 | 93 |
| Foam Height after 1 min., mm | 32 | 6 | 70 | 35 |
| Foam Height after 2 min., mm | 18 | 5 | 49 | 31 |
| Foam Height after 5 min., mm | 13 | 2 | 21 | 26 |
| Foam Height after 10 min., mm | 5 | 0 | 19 | 16 |
| Wet Sedimentation Properties for Dip Slurries[2] | | | | |
| RSV after 6 Hrs., cm$^3$ | 44 | 240 | 19 | 22 |
| RSV after 24 Hrs., cm$^3$ | 50 | 186 | 31 | 25 |
| Wet Sediment Characteristics | Soft Sediment - moderate mixing needed to re-suspend | Very Fluffy Sediment - minimal agitation needed to re-suspend | Hard Packed & Gummy Sediment - difficult to re-suspend; required high speed mixing | Hard Packed & Gummy Sediment - difficult to re-suspend; required high speed mixing |
| Anti-Tack Coating Properties on Uncured Rubber | | | | |
| Rubber Coating Coverage | Uniform Opaque Coating | Heavy Opaque Coating with Flocculated Appearance | Splotchy Non-Uniform Coating | Splotchy & Streaky Coating; Uncoated Spots |

TABLE VI-continued

Slab Dip Performance Testing of Talc Based Anti-Tacks at 4% Dip Slurry Solids

| Anti-Tack Performance[3] Rating (0 → 6) | 4 (Good) | 5 (Very Good) | 2 (Fair) | 1 (Poor) |
|---|---|---|---|---|

Note:
[1]Talc Formulations were transformed into 4%solids slab dip slurries via dilution with deionized water then 700 ml of the resultant slab dip slurry was transferred to a 1 liter graduatedglass cylinder whose top can be sealed by a ground glass stopper. Upon filling the glass cylinder, it was stoppered andthen inverted upside down 10 times in rapid succession (each inversion cycle taking about 2 seconds). After sittingthe cylinder down the initial foam height above the 700 ml mark was recorded and the slab dip slurry was thenallowed to sit undisturbed. The foam level was then monitored and measured over specific time internals up to atotal time of 10 minutes.
[2]Talc Formulations were transformed into 4%solids slab dip slurries via dilution with deionized water then 1,000 ml of the resultant slab dip slurry was transferred to a 1 liter graduatedglass cylinder whose top can be sealed by a ground glass stopper. Upon filling the glass cylinder, it was stoppered andthen allowed to stand undisturbed. Pigment sedimentation in the slab dip slurries was monitored over time andmeasurement levels in the cylinder were noted in $cm^3$ and recorded after 6 hoursand then again after 24 hours. The dip slurry of Formula D settled in a different manner than the other three. The dip slurry of Formula D quicklysettled into a voluminous fluffy suspension that gradually compacted down over time. In contrast, the otherdip slurries yielded more compact sediments that increased in total volume over time as more material settledout.
[3]Anti-Tack coating performance wasqualitatively assessed on the following rating scale:

| Rating | Rating Description |
|---|---|
| 0 | Fail = Rubber test slabs completely stuck together; unable to separate. |
| 1 | Poor = Rubber test slabs were stuck in multiple areas; difficult toseparate |
| 2 | Fair = Rubber test slabs were moderately adhered to each other but couldbe separated with a moderate level of applied pull force |
| 3 | Acceptable = Rubber test slabs were lightly adhered but they could beseparated with a minimal level of applied pull force |
| 4 | Good = Slabs not adhered; only minor tack in small areas of contact wasdetected |
| 5 | Very Good = Slabs not adhered; almost negligible tack in single small areaof contact was detected |
| 6 | Excellent = Absolutely no adherence/tack between the rubber slabs. |

Three different types of dip slurry performance properties are being assessed in this example and the results for each are summarized in Table VI. The first dip slurry performance property assessed was the foam performance of the 4% solids dip slurries. Initial foam heights were determined and then the subsequent foam heights after time intervals of 1 minute, 2 minutes, 5 minutes and 10 minutes were respectively determined. Details associated with the foam testing methodology are summarized in the footnote section of Table VI. A review of the foam test data indicates that the slab dip slurries derived from the talc formulas containing PolyDADMAC cationic polymer, namely Formulas C and D, yielded less initial foam. In addition, their dip slurry foam was less stable so it subsequently died off more quickly and to a lower level than what was observed with the 4% dip slurries derived from either Formula E or F. Lower levels of dip foam are always desired in rubber slab dip applications. Foam is not only a housekeeping issue but dried clumps of foam on the surface of uncured rubber compounds can entrap moisture underneath, which can subsequently result in the formation of blisters during the compound's molding process.

The second dip performance property assessed was the pigment settling characteristics of the 4% solids dip slurries. The 4% solids dip slurries were allowed to statically settle over a 24 hour time period in a 1 liter glass graduated cylinder and their relative sediment volumes (RSV) were then measured after 6 hours and 24 hours. Details associated with this sedimentation testing methodology are summarized in the footnote section of Table VI. The importance and significance of RSV as it relates to particle agglomeration and subsequent imperfect particle packing has been previously discussed in the invention summary and the concept is also explained in U.S. Pat. No. 6,156,117. Once again, the talc formulas containing PolyDADMAC cationic polymer, namely Formulas C and D, resulted in 4% solids dip slurries that yielded far more voluminous wet sediments as a consequence of the Talc platelets being flocculated into loosely bound agglomerates having inter-particle void spaces. As seen in Table VI, their relative sediment volumes after either 6 hours or 24 hours were notably greater than those produced from the 4% solids dip slurries derived from Formulas E and F where no PolyDADMAC was employed. These differences in RSV value between the 4% solids dip slurries derived from Formulas C, D and E are visually evident in FIG. 2. It is also interesting to note that Formula D yielded a significantly higher RSV than Formula C even though the active basis dosage level of PolyDADMAC employed in the two formulas was the same (0.09% by weight of the total formulation). In FIG. 1, these same anti-tack formulas made on a production scale (Formulas A and B, respectively) had indicated that the increase in their particle size distributions versus the 4:1 w/w blend of starting 3 micron mps and 1 micron mps talc pigments was roughly the same. Both anti-tack formulas showed about a 25% increase in median particle size based on measurements made with a Horiba LA-300 laser light scattering particle size analyzer.

While the notable difference in RSV between Formulas C and D is not fully understood, it is believed that the difference is likely a consequence of the higher nonionic surfactant and anionic alkali metal fatty acid soap levels employed in Formula C. The higher concentration of nonionic surfactants and anionic soaps being used in Formula C likely wets the talc particles more completely allowing them to compact down to a greater degree. Greater compaction of the wetted talc platelets would therefore result in a lower RSV value being measured. Even though this argument suggests that nonionic surfactant and anionic soap levels can have some impact on the RSV value, the comparative examination of the dip slurries derived from Formulas C versus E clearly indicates the sediment bulking effect that results from adding the PolyDADMAC polymer. Formula E is compositionally identical to Formula C with the exception that no PolyDADMAC was utilized in the E formulation.

The 24 hour RSV value of Formula E's 4% solids dip slurry was 31 cm³ whereas the 4% solids dip slurry of Formula C yielded a 24 hour RSV value of 50 cm³. This notable difference equates to a 61% increase in RSV by simply using a PolyDADMAC active basis dosage of only 0.09% by weight of the total formulation. Lastly, it should be noted that the higher RSV values associated with Formulas C and D have resulted in wet talc sediments that are soft or fluffy hence they are easy to re-suspend with minimal to moderate levels of agitation. In contrast, the wet sediments associated with the 4% solids dip slurries of Formulas E and F are gummy and hard packed hence they are a lot more difficult to re-suspend. The consistency of these wet sediments was assessed by probing the bottom of the storage flasks with a plastic spatula. Having an effective dip slurry product that does not hard pack settle is definitely desirable. Also, hard pack settling of talc dominated anti-tack formulations has historically been a major limitation that is now overcome by the current invention through the employment of a cationic polymer such as PolyDADMAC.

The third dip performance property assessed in Example 2 was the anti-tack coating properties of the slab dip formulations on an uncured rubber compound. Once again, 4% solids slab dip slurries derived from Formulas C, D, E and F were employed. The uncured rubber compound utilized in the dip coating application study was a typical passenger tire sidewall compound that employs a NR/BR/EPDM polymer blend. Uncured rubber compound was refreshed on a 2-roll mill and then calendared off into a sheet that was approximately 0.125 inches in thickness. This rubber sheet was then cut into rectangular test pieces that were approximately 4 inches long×1.5 inches wide×0.125 inches thick. The 4% solids dip slurries derived from Formulas C, D, E and F were subsequently heated to 110° F. in a microwave oven and kept continuously stirred for dip coating use. The uncured rubber test pieces were individually placed in a Quincy Labs 20GC gravity convection lab oven, whose temperature thermostat was set at 375° F., and then heated for about 2 minutes in order to raise their surface temperature to about 225-230° F. as measured with a digital laser IR Temperature gun (FLUKE Model 62 Max Plus). An oven-heated test piece of uncured rubber was then dipped into the stirred 4% dip slurry whose slurry temperature was being maintained at about 108-110° F. Total immersion time of the rubber test piece was about 5 seconds. The wetted test piece of rubber was then air dried using ambient temperature blown air (from a nearby fan) to yield a coated rubber specimen for anti-tack performance assessment. A pair of rubber test pieces was dip coated for each of the 4% solids dip slurries. The resultant coating coverage results are summarized in Table VI and FIG. 3 shows representative examples of the coated rubber specimens after drying. The dip coating results indicate that the 4% solids dip slurries derived from Formulas C and D yield more uniform, opaque coatings on the rubber test pieces of heavier coat weight. In comparison, the dip coatings associated with using the 4% solids dip slurries derived from Formulas E and F were not uniform and they were very splotchy in appearance. After a pair of coated rubber specimens was generated, the pair was placed in aligned face-to-face contact with one another and then placed between a set of polished stainless steel plates whereupon a 20 lbs. certified weight was placed on top of the plates for a period of 24 hours under ambient room temperature (20-25° C.) conditions. After the 24 hour contact period, the 20 lbs. weight and stainless steel plates were removed and then the pair of coated rubber specimens which had been compressed together in intimate contact was assessed for their degree of adherence to one another. Anti-tack performance was then qualitatively assessed on the basis of the following rating scale:

| Rating | Rating Description |
| --- | --- |
| 0 | Fail = Rubber test slabs completely stuck together; unable to separate. |
| 1 | Poor = Rubber test slabs were stuck in multiple areas; difficult to separate |
| 2 | Fair = Rubber test slabs were moderately adhered to each other but could be separated with a moderate level of applied pull force |
| 3 | Acceptable = Rubber test slabs were lightly adhered but they could be separated with a minimal level of applied pull force |
| 4 | Good = Slabs not adhered; only minor tack in small areas of contact was detected |
| 5 | Very Good = Slabs not adhered; almost negligible tack in single small area of contact was detected |
| 6 | Excellent = Absolutely no adherence/tack between the rubber slabs. |

The anti-tack performance ratings for the 4% solids dip slurries derived from Formulas C, D, E and F are summarized in Table VI. The 4% solids dip slurries derived from Formulas C and D both yielded "Good" to "Very Good" anti-tack coating performance as a consequence of employing some PolyDADMAC polymer. In contrast, the 4% solids dip slurries derived from Formulas E and F, which contain no PolyDADMAC polymer, yielded only Fair to Poor anti-tack coating performance. The significant difference in anti-tack coating performance between the 4% solids dip slurries derived from Formulas C and E clearly demonstrates the benefit of adding a low dosage level of PolyDADMAC polymer to the talc-based anti-tack formulation. Formula E is compositionally identical to Formula C with the exception that no PolyDADMAC was utilized in the E formulation. The significant improvement in dip coating coverage and anti-tack performance on uncured rubber compounds associated with employing low dosage levels of PolyDADMAC cationic polymer in the inventive talc-based dip slurry formulations, per the 4% solids dip slurries of Formulas of C and D, are remarkable and truly unexpected.

Example 3

This Example is analogous to Example 2 in scope and in dip slurry testing protocol except that four new anti-tack formulations were produced on a laboratory bench scale for testing. Formulations G, H, I and J of Table VII are all compositionally related to Formula C of Example 2.

Compositionally anti-tack Formulas G, H, I, and J are identical to anti-tack Formula C except that a portion of the 3 micron mps talc content has been replaced by an another anti-block pigment (namely with calcium stearate, calcium carbonate, calcined kaolin clay and phlogopite mica, respectively). In each case, 26.67% by weight of the active basis 3 micron mps talc content present in Formula C has been replaced in producing this new set of anti-tack formulas. In these new formulations, this means that about 21.3% by weight of the total dry basis talc content, the total being the combined amount of 3 micron mps talc plus 1 micron mps talc, has been replaced with the aforementioned alternative anti-block pigments. However, since the partial talc replacement strategy with alternative anti-blocks selectively replaced just 3 micron mps talc this means the active basis weight ratio of 3 micron mps talc to 1 micron mps talc in the formulas has been reduced from its original 4:1 w/w ratio to about a 2.91:1 w/w ratio. In terms of overall formulation weight %'s, the 3 micron mps talc (SAS-3) has therefore been reduced in formula weight % from 37.50% to 27.50%, the 1 micron mps talc (FlexTalc 610) remains the same at a formula weight % of 9.44%, while the alternative anti-block replacement pigment (calcium stearate, calcium carbonate, calcined kaolin clay or phlogopite mica) has increased in formula weight % from 0.00% to 10.00%. In these experiments, the larger 3 micron mps talc was chosen for selective replacement since some of the anti-block replacement pigments, namely the calcium stearate and the phlogopite mica, are larger in particle size and both have platy morphology. The Baerolub S-VSA-200 is a −200 mesh, fusion grade calcium stearate which typically has a Microtrac median particle size of about 16-20 microns whereas the Suzorite 325-S is a −325 mesh, phlogopite mica having a Cilas median particle size of about 35 microns and a Jennings aspect ratio of about 80.

All the new anti-tack formulas were produced on a 5,300 gram scale using a high speed, single-shaft lab disperser unit equipped with a Cowles cutting-style dispersion blade. The overall method of making Formulas G, H, I, and J was analogous to the stepwise pigment addition scheme previously outlined in Process Scheme 1 (Table III) wherein the nonionic surfactants and anionic alkali metal fatty acid soaps are intermittently incorporated to keep the batch fluid and well mixed during the course of the slurry dispersion process.

Batch Formulas G, H, I, and J were fully characterized and their respective physical properties were then tracked over a period of 2 weeks (as summarized in Table VII). Physical properties that were monitored include Brookfield Viscosity values determined at 2 rpm and 20 rpm, pH and Conductivity. All four batches had % solids contents greater than 50% and all yielded an initial Brookfield 2 rpm viscosity between 10,000-20,000 cps. All the formulas showed no evidence of pigment settling and no observed syneresis during their 2 week aging period. After aging for 2 weeks at room temperature (20-25° C.), all four formulas had a 2 rpm Brookfield Viscosity less than 150,000 cps and also had a 20 rpm Brookfield Viscosity less than 20,000 cps. In short, these anti-tack formulations are all viable to be manufactured, stored, transported and pumped.

TABLE VII

Physical Property Tracking Data[a] for Lab Anti-Tack Formulations G, H, I & J:

| Anti-Tack Formula (% Solids[b] & Description) | Initial BF Viscosity, pH & Conductivity[c] | Aged BF Visc., pH & Cond. after Aging 3 Days | Aged BF Visc., pH & Cond. after Aging 7 Days | Aged BF Visc., pH & Cond. after Aging 14 Days |
|---|---|---|---|---|
| Formula G @ 52.0% Solids Description: Formula C via Cowles but 26.67% Repl. of 3 micron Talc with BaeroLub VSA-200 Ca Stearate | Sp #91 BF @ 2 rpm = 19,500 cps BF @ 20 rpm = 4,860 cps pH = 9.80 Cond. = 2.28 mS/cm | Sp #91 BF @ 2 rpm = 57,400 cps BF @ 20 rpm = 10,260 cps pH = 9.87 Cond. = 2.51 mS/cm | Sp #92 BF @ 2 rpm = 71,200 cps BF @ 20 rpm = 11,580 cps pH = 9.55 Cond. = 2.41 mS/cm | Sp #92 BF @ 2 rpm = 86,800 cps BF @ 20 rpm = 13,420 cps pH = 9.60 Cond. = 2.06 mS/cm |
| Formula H @ 52.15% Solids Description: Formula C via Cowles but 26.67% Repl. of 3 micron Talc with HuberCarb G2 CaCO$_3$ | Sp #91 BF @ 2 rpm = 14,600 cps BF @ 20 rpm = 3,350 cps pH = 9.94 Cond. = 3.17 mS/cm | Sp #91 BF @ 2 rpm = 29,600 cps BF @ 20 rpm = 5,770 cps pH = 9.85 Cond. = 3.21 mS/cm | Sp #91 BF @ 2 rpm = 36,000 cps BF @ 20 rpm = 6,810 cps pH = 9.76 Cond. = 3.25 mS/cm | Sp #91 BF @ 2 rpm = 45,000 cps BF @ 20 rpm = 7,600 cps pH = 9.61 Cond. = 3.30 mS/cm |
| Formula I @ 52.35% Solids Description: Formula C via Cowles but 26.67% Repl. of 3 micron Talc with Iceberg Calcined Kaolin | Sp #91 BF @ 2 rpm = 16,500 cps BF @ 20 rpm = 4,150 cps pH = 9.49 Cond. = 2.52 mS/cm | Sp #91 BF @ 2 rpm = 54,400 cps BF @ 20 rpm = 10,060 cps pH = 9.63 Cond. = 2.76 mS/cm | Sp #92 BF @ 2 rpm = 68,800 cps BF @ 20 rpm = 12,160 cps pH = 9.42 Cond. = 2.74 mS/cm | Sp #92 BF @ 2 rpm = 91,600 cps BF @ 20 rpm = 15,240 cps pH = 9.28 Cond. = 2.69 mS/cm |
| Formula J @ 52.75% Solids Description: Formula C via Cowles but 26.67% Repl. of 3 micron Talc with Suzorite 325-S Mica | Sp #91 BF @ 2 rpm = 18,300 cps BF @ 20 rpm = 4,710 cps pH = 9.73 Cond. = 2.39 mS/cm | Sp #91 BF @ 2 rpm = 71,000 cps BF @ 20 rpm = 12,680 cps pH = 9.64 Cond. = 2.58 mS/cm | Sp #92 BF @ 2 rpm = 85,000 cps BF @ 20 rpm = 14,540 cps pH = 9.53 Cond. = 2.53 mS/cm | Sp #92 BF @ 2 rpm = 108,000 cps BF @ 20 rpm = 17,460 cps pH = 9.41 Cond. = 2.52 mS/cm |

Notes:
[a]Test batches were all aged at room temperature (20-25° C.). Properties were all determined at 25° C. Brookfield Viscosities were measured using a Brookfield RVDVE Heliopath Viscometer Unit equipped with T-spindles run at 2 rpm and then 20 rpm; T-spindles A (#91) & B (#92) were used as required.
[b]% Solids values were determined by the use of a halogen lamp based AND Model MF-50 Moisture Balance using a temperature setting of 150° C.
[c]All pH values were determined at 25° C. using an Oakton pH 450 meter. Conductivity values were determined at 25° C. using an Oakton CON 700 conductivity/TDS meter.

In Table VIII below, the dip slurry performance properties of Formulas G, H, I, and J are critically compared whereby each anti-tack formula was transformed via dilution with water into slab dip slurries of 4% solids content for end use application testing. Three different types of dip performance properties were again assessed using all the same testing protocols previously outlined and discussed in Example 2. The testing results are summarized in Table VIII. All the anti-tack formulas, with the exception of Formula H, yielded comparable amounts of dip slurry foam to the 4% solids dip slurries previously derived from Formulas C and D. However Formula H, which utilized some fine particle ground calcium carbonate (HuberCarb G2; reported Sedigraph mps=2 microns) as a partial replacement for the 3 micron mps talc, exhibited a somewhat higher level of foam. Reducing Formula H's foam level can likely be addressed by decreasing the amounts of nonionic surfactant and alkali metal fatty acid soap being employed in that particular formulation or by using nonionic surfactants in the same chemical family having a slightly lower HLB that will be inherently less foamy. Furthermore, it should be noted that the wet sediments arising from the dip slurries of Formula's G through J were in general more packed and gummy than those originating from the dip slurries of Formulas C and D. Once again, this can likely be addressed by reducing the amounts of nonionic surfactant and anionic soap being employed and/or by increasing the amount of PolyDADMAC polymer that is utilized to increase the overall amount of mineral particle flocculation that is created. It is not too surprising that partial replacement of the 3 micron talc pigmentation with other alternative anti-block pigments would require some tweaking of the nonionic surfactant, anionic soap and cationic polymer package amounts to optimize the new formula's dip slurry properties since the replacement pigments have different surface chemistries, different surface charge properties and different surface areas. With regards to the wet sediment volumes, the higher RSV value associated with the dip slurry derived from Formula I may seem to be an anomaly in light of its packed, gummy sediment but this situation can be easily explained on the basis of the structured pigment morphology of calcined kaolin clays. It is known in the prior art that kaolin platelets are fused together into structured aggregates during the high temperature calcination process such that calcined clays inherently provide more bulking properties. The calcined kaolin clay used in Formula I was a conventional paint and coatings grade calcined kaolin (Burgess Pigment Company's Iceberg) which has a reported Sedigraph median particle size of about 1.3 microns.

What is more critical in this initial formulation screening of other anti-blocks as partial replacements for the 3 micron mps talc pigmentation is the coating coverage and resultant anti-tack performance properties on uncured rubber compounds. All the 4% solids dip slurries yielded a uniform, opaque coating on the uncured rubber compound. The 4% solids slab dip slurries derived from Formulas G and J were in particular "Very Good" anti-tacks as judged on the basis of our anti-tack performance rating criteria. This example clearly demonstrates that very functional anti-tacks can be formulated whereby a portion of the 3 micron mps talc can be effectively replaced by other anti-block pigments in replacement amounts up to about 25-30% by weight. Particularly effective anti-block pigments, as demonstrated in this example, are those having platelet morphology such as fusion grade calcium stearate pigments and mica pigments. Consequently, high aspect ratio delaminated kaolin clays may also be particularly effective anti-block candidate given their platy morphology and associated aspect ratio that can be similar in magnitude to the aspect ratio of fine particle talcs. For one skilled in the art the desired improvements in dip slurry foam and in pigment suspension for the 4% solids dips of Formulas G and J can be realized through adjusting the relative amounts of nonionic surfactants, anionic alkali metal fatty acid soaps, defoamer and PolyDADMAC cationic polymer used in the formulation. While the costs associated with calcium stearate pigments and mica pigments are typically more than for a fine particle, dry ground talc the additional raw material cost associated with partially replacing a portion of the talc may be warranted based on final cost versus performance considerations.

TABLE VIII

| Slab Dip Performance Testing of Talc Based Anti-Tacks at 4% Dip Slurry Solids | | | | |
|---|---|---|---|---|
| Formula ID | Talc Formula G | Talc Formula H | Talc Formula I | Talc Formula J |
| Product Description | Formula C but 26.67% Repl. of 3 micron Talc with BaeroLub VSA-200 Calcium Stearate | Formula C but 26.67% Repl. of 3 micron Talc with HuberCarb G2 $CaCO_3$ | Formula C but 26.67% Repl. of 3 micron Talc with Iceberg Calcined Kaolin Clay | Formula C but 26.67% Repl. of 3 micron Talc with Suzorite 325-S Mica |
| Foam Properties for Dip Slurries[1] | | | | |
| Initial Foam Height, mm | 43 | 126 | 88 | 78 |
| Foam Height after 1 min., mm | 31 | 104 | 63 | 47 |
| Foam Height after 2 min., mm | 30 | 99 | 29 | 29 |
| Foam Height after 5 min., mm | 23 | 65 | 20 | 18 |
| Foam Height after 10 min., mm | 19 | 32 | 18 | 7 |
| Wet Sedimentation Properties for Dip Slurries[2] | | | | |
| RSV after 6 Hrs., cm | 17 | 6 | 67 | 33 |
| RSV after 24 Hrs., $cm^3$ | 28 | 14 | 67 | 50 |
| Wet Sediment Characteristics | Hard Packed & Gummy Sediment - difficult to re- | Hard Packed & Gummy Sediment - difficult to re- | Hard Packed & Gummy Sediment - difficult to re- | Soft Sediment - moderate mixing needed to re- |

TABLE VIII-continued

Slab Dip Performance Testing of Talc Based Anti-Tacks at 4% Dip Slurry Solids

|  | suspend; required high speed mixing | suspend; required high speed mixing | suspend; required high speed mixing | suspend |
|---|---|---|---|---|
|  | Anti-Tack Coating Properties on Uncured Rubber | | | |
| Rubber Coating Coverage | Uniform Opaque Coating | Uniform Opaque Coating | Uniform Opaque Coating | Uniform Opaque Coating |
| Anti-Tack Performance[3] Rating (0 → 6) | 5 | 3 | 4 | 5 |

Note:
[1]Talc Formulas were transformed into 4% solids dip slurries via dilution with deionized water then 700 ml of the resultant dip slurry was transferred to a 1 liter graduated glass cylinder whose top can be sealed by a ground glass stopper. Upon filling the glass cylinder, it was stoppered and then inverted upside down 10 times in rapid succession (each inversion cycle taking about 2 seconds). After sitting the cylinder down the initial foam height above the 700 ml mark was recorded and the slab dip slurry was then allowed to sit undisturbed. The foam level was then monitored and measured over specific time internals up to a total time of 10 minutes.
[2]Talc Formulas were transformed into 4% solids slab dip slurries via dilution with deionized water then 1,000 ml of the resultant slab dip slurry was transferred to a 1 liter graduated glass cylinder whose top can be sealed by a ground glass stopper. Upon filling the glass cylinder, it was stoppered and then allowed to stand undisturbed. Pigment sedimentation in the slab dip slurries was monitored over time and measurement levels in the cylinder were noted in $cm^3$ and recorded after 6 hours and then again after 24 hours. The dip slurry of Formula I settled in a different manner than the other three. The 4% solids dip slurry of Formula I completely settled within 6 hours and no further changes in RSV value were noted beyond that timeframe. In contrast, the other dip slurries yielded more compact sediments that increased in total volume over time as more material settled out.
[3]Anti-Tack coating performance was qualitatively assessed on the following rating scale:

| Rating | Rating Description |
|---|---|
| 0 | Fail = Rubber test slabs completely stuck together; unable to separate. |
| 1 | Poor = Rubber test slabs were stuck in multiple areas; difficult to separate |
| 2 | Fair = Rubber test slabs were moderately adhered to each other but could be separated with a moderate level of applied pull force |
| 3 | Acceptable = Rubber test slabs were lightly adhered but they could be separated with a minimal level of applied pull force |
| 4 | Good = Slabs not adhered; only minor tack in small areas of contact was detected |
| 5 | Very Good = slabs not adhered; almost negligible tack in single small area of contact was detected |
| 6 | Excellent = Absolutely no adherence/tack between the rubber slabs. |

Example 4

This anti-tack formulation experiment was carried out as follow-up work to Formula J in Example 3 and it is analogous in testing scope to Example 3. However, in this example, the weight % amounts of Valpro 59 soap and Ethal TDA-5 nonionic surfactant being used in new Formula K were notably reduced to demonstrate the effect that anionic soap plus nonionic surfactant levels can collectively have on resultant dip slurry foam and RSV wet sedimentation properties. However, the weight % amount of PolyDADMAC cationic polymer being employed in Formulas J versus K was kept constant. Like Formula J, new Formula K is a talc plus mica combination of anti-block pigments whereby the relative active basis weight ratio of the total combined talc pigments to 35 micron mica is about 3.7:1. The talc portion of the formula's anti-block pigmentation consists of 3 micron mps talc plus 1 micron mps talc in about a 2.91:1 relative active basis weight ratio. The full compositional details on Formula K are summarized in Table IX.

TABLE IX

Compositional Summary for Anti-Tack Talc/Mica Formulation K

| Chemical | | Properties & | | Talc/Mica Anti-Tack Formula K[c] Method: Dual Shaft High-Speed Disperser | |
|---|---|---|---|---|---|
| Tradename/ Supplier | Chemical Name | Functionality of Ingredient | CAS # | Wt. in Lab Batch, g | Wt. % in Formula |
| Soft Water | Dihydrogen Oxide | Solvent Phase | 7732-18-5 | 2581.18 | 48.70% |
| Talc SAS-3/ Cimbar Performance Minerals | Talc; Magnesium Silicate Hydrate | Anti-Block Pigment (3 micron median p.s.)[a] | 14807-96-6 | 1457.50 | 27.50% |
| FlexTalc 610/ Cimbar Performance Minerals | Talc; Magnesium Silicate Hydrate | Anti-Block Pigment (1 micron median p.s.)[a] | 14807-96-6 | 500.56 | 9.44% |
| Suzorite 325S Mica/Imerys | Phlogopite Mica | Anti-Block Pigment (35 micron median p.s.)[a] | 12001-26-2 | 530.00 | 10.00% |

TABLE IX-continued

Compositional Summary for Anti-Tack Talc/Mica Formulation K

| Chemical Tradename/ Supplier | Chemical Name | Properties & Functionality of Ingredient | CAS # | Talc/Mica Anti-Tack Formula K[c] Method: Dual Shaft High-Speed Disperser | |
|---|---|---|---|---|---|
| | | | | Wt. in Lab Batch, g | Wt. % in Formula |
| Ethal TDA-5/ Ethox Chemicals | PEG-5 Tridecyl Ether; Trideceth-5 | Interfacial Wetting (pigment & rubber); Nonionic Surfactant with HLB = 10.4 | 24938-91-8 | 53.29 | 1.01% |
| Norfox 92/ Norman, Fox & Co. | Sodium Tallowate Soap | Interfacial Wetting (pigment & rubber) | 8052-48-0 | 57.42 | 1.08% |
| ValPro 59/ Vanguard Soap | Blend of Sodium Vegate + Sodium Cocoate Soaps | Interfacial Wetting (pigment & rubber) | 68082-64-4 & 61789-31-9 | 19.43 | 0.37% |
| Konasil 200/ OCI | 200 $m^2$/g Fumed Silica; Synthetic Amorphous Silicon Dioxide | Pigment Suspension, Foam Control & Anti-Block | 7631-86-9 | 31.80 | 0.60% |
| DEE FO 3010A/ Munzing Chemie | Petroleum distillates, blend of light & heavy paraffinic oils | Oil based Defoamer | 64742-56-9 & 64742-65-0 | 15.90 | 0.30% |
| Xanthan Gum/ Global Ingredients | Xanthan Gum; Polysaccharide | Pigment Suspension Aide | 11138-66-2 | 13.78 | 0.26% |
| n-Butyl Stearate/ Custom Synthesis, LLC | n-Butyl Stearate | Pigment Wetting & Defoamer | 123-95-5 | 10.60 | 0.20% |
| PhosFlex 4/ICL Industrial Products | Tri-n-butyl Phosphate | Defoamer | 126-73-8 | 10.60 | 0.20% |
| Pangel W/Tolsa Group | Sepiolite; Hydrous Magnesium Silicate | Pigment Suspension Aide | 63800-37-3 | 5.30 | 0.10% |
| PDMBL Series/ Isomeric Industries | PolyDADMAC; Polydiallyldimethyl Ammonium Chloride (Mw = 493,000 Da)[b] | Water Soluble Cationic Polymer; Pigment Flocculating Agent | 26062-79-3 | 4.96 | 0.09% |
| BSC 3243/Bulk Chemical Services | Dazomet; Tetrahydro-3,5-dimethyl-2H-1,3,5-thiadiazine-2-thione | Biocide | 533-74-4 | 3.98 | 0.08% |
| BCS 3502A/ Bulk Chemical Services | Glutaraldehyde | Biocide | 111-30-8 | 3.18 | 0.06% |
| Surfynol 440/ Evonik | PEG-3.5 2,4,7,9-tetramethyl 5 decyn-4,7-diol | Interfacial Wetting (pigment & rubber); Nonionic Surfactant with HLB = 8.0 | 9014-85-1 | 0.53 | 0.01% |
| | | | Totals= | 5,300 g | 100.00% |

Notes:
[a]Median particle sizes of the Talc & Mica pigments were determined using a Cilas 990 L Particle Size analyzer.
[b]The Mw of the cationic polymer was determined by Jordi Labs of Mansfield, MA using Tetra-Detection Gel Permeation Chromatography (GPC-T).
[c]The physical properties obtained for this batch are summarized in Table X.

Formula K was produced on a 5,300 gram lab scale using a dual-shaft lab disperser unit whereby the high speed shaft was equipped with a Cowles cutting-style dispersion blade. The overall methodology of making Formula K was analogous to the stepwise pigment addition scheme previously outlined in Process Scheme 1 wherein the nonionic surfactants and anionic alkali metal fatty acid soaps are intermittently incorporated to keep the batch fluid and well mixed during the course of the slurry dispersion process.

The batch for Formula K was fully characterized immediately after being produced and its physical properties were then retested after a 2 week aging period (data are summarized in Table X).

TABLE X

Physical Test Properties of Talc/Mica
Anti-Tack Formulation K (from Table IX)

| | Initial QC Test Properties for Batch[1] | 2-Week Aged Test Properties for Batch[1] |
|---|---|---|
| pH @ 25° C. | 9.63 | 9.36 |
| Conductivity @ 25° C., mS/cm | 2.27 | 2.63 |
| BF Viscosity (Sp# 91 or 92 @ 2 rpm), cps | 19,800 | 100,200 |
| BF Viscosity (Sp# 91 or 92 @ 20 rpm), cps | 4,230 | 14,900 |
| Specific Gravity[2] @ 25° C., g/ml | 1.36 | — |
| Solids Content[3], Wt. % | 51.0 | — |

Notes:
[1]Test batch was aged at room temperature (20-25° C.). Properties were all determined at 25° C. The pH values were determined using an Oakton pH 450 meter. Conductivity values were determined using an Oakton CON 700 conductivity/TDS meter. The Brookfield Viscosities were measured using a Brookfield RVDVE Heliopath Viscometer Unit equipped with T-spindles run at 2 rpm and then 20 rpm; T-spindle A (#91) was employed for the initial BF readings while T-spindle B (#92) was employed for the BF readings on the 2-week aged batch.
[2]Specific gravity was determined using a 100 ml specific gravity cup in accordance with ASTM D1475.
[3]% Solids was determined by the use of a halogen lamp based AND Model MF-50 Moisture Balance using a temperature setting of 150° C.

Physical properties that were tested on Formula K include % solids content, specific gravity, its Brookfield Viscosity values determined at 2 rpm and 20 rpm, pH and conductivity. Formula K is a slurry concentrate that has a % solids content greater 50% and the batch yielded an initial Brookfield 2 rpm viscosity between 10,000-20,000 cps. It showed no evidence of pigment settling and no observed syneresis during its 2 week aging period. After aging for 2 weeks at room temperature (20-25° C.) Formula K yielded a 2 rpm Brookfield Viscosity less than 150,000 cps and also had a 20 rpm Brookfield Viscosity less than 20,000 cps. Formula K is therefore a high solids, talc plus mica anti-tack formulation that is viable to be manufactured, stored, transported and pumped.

The dip slurry performance properties of Formula K were then critically assessed whereby the slurry concentrate was transformed via dilution with water into a slab dip slurry of 4% solids content for end use application testing. Three different types of dip performance properties were again evaluated using all the same testing protocols previously outlined and discussed in Examples 2 and 3. The dip slurry testing results are summarized in Table XI.

TABLE XI

Slab Dip Testing of Talc/Mica Based
Anti-Tack at 4% Dip Slurry Solids

| Formula ID | Talc/Mica Formula K |
|---|---|
| Product Description | Talc/Mica Anti-Tack Formula with Reduced %'s of V59 Soap & TDA-5 Surfactant |
| Foam Properties for Dip Slurry | |
| Initial Foam Height, mm | 28 |
| Foam Height after 1 min., mm | 0 |
| Foam Height after 2 min., mm | 0 |
| Foam Height after 5 min., mm | 6 |
| Foam Height after 10 min., mm | 0 |
| Wet Sedimentation Properties for Dip Slurry | |
| RSV after 6 Hrs., cm³ | 122 |
| RSV after 24 Hrs., cm³ | 75 |
| Wet Sediment Characteristics | Soft Sediment - moderate mixing needed to re-suspend |
| Anti-Tack Coating Properties on Uncured Rubber | |
| Rubber Coating Coverage | Uniform Opaque Coating |
| Anti-Tack Performance Rating (0 → 6) | 4 |

When comparing the dip slurry foam results for Formula K versus Formula J the level of initial foam height has been significantly reduced (from 78 mm to 28 mm). Furthermore, for Formula K the initial dip foam level that was created was not stable and it completely died off very quickly in less than 1 minute. The dip slurry foam associated with Formula J also died off albeit more slowly and not to the same extent. These foaming differences indicate a significant improvement in dip slurry foam control by reducing the amounts of nonionic alkali metal fatty acid soap and nonionic surfactant that is employed in Formula K. However, the overall levels of anionic alkali metal fatty acid soap and nonionic surfactant therein were still sufficient to yield an effective anti-tack dip coating on an uncured elastomeric compound. Furthermore, reducing the amounts of anionic alkali metal fatty acid soap and nonionic surfactant employed in the anti-tack formulation had a positive effect on increasing the RSV value of its resultant wet sediment after the 4% solids dip slurry was allowed to stand undisturbed for 24 hours. This improvement in soft wet sediment volume is seen by comparing the 24 hour RSV values associated with Formula J (50 cm³; Table VIII) versus the 24 hour RSV associated with Formula K (75 cm³; Table XI). Increasing the soft wet sediment volume is desirable as it minimizes the potential for hard packing of the mineral pigmentation in the dip slurry tanks and lines when dip systems are shut-down for maintenance reasons or over holidays. Example 4 further illustrates within the scope of the invention that overall dip slurry performance properties (foam, RSV, coating coverage and anti-tack effectiveness) can be readily altered as desired through adjusting the relative amounts of nonionic surfactants, anionic alkali metal fatty acid soaps, defoamer, and PolyDADMAC cationic polymer that are being used in the anti-tack formulation.

As such, an invention has been disclosed in terms of preferred embodiments thereof which fulfills each and every one of the objects of the present invention as set forth above and provides a new and improved anti-tack formulation of high solids content that uses an effective amounts of a fine particle talc, an anti-tack formulation of lower solids content and a method of using the lower solids content formulation in rubber anti-tack applications.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. An aqueous anti-tack dispersion comprising talc particles having a median particle size range of less than 7 microns, the talc particles in an amount ranging from 40% to 72% of the total dispersion weight, the aqueous anti-tack dispersion having a total solids content 45-75% by weight of the dispersion, the talc particles dispersed in the aqueous anti-tack dispersion and forming a slurry the anti-tack dispersion further comprising:
   a polyquaternary cationic polymer having a molecular weight between about 50,000 to 2,000,000 Daltons in an effective amount to at least prevent hard pack settling of the talc when the anti-tack dispersion is used in a diluted form for coating uncured rubber compound products and/or improving anti-tack coating coverage of the uncured rubber compound products;
   one or a combination of the following:
   a) one or more nonionic surfactants of intermediate HLB value of 6 to 12 in a total amount ranging from about 0.01-4.0% of the total dispersion weight; and
   b) one or more alkali metal, saturated or unsaturated, $C_8$-$C_{20}$ fatty acid soaps in a total amount ranging from about 0.01-3.0% of the total dispersion weight; and
   optionally, one or more suspension aids in a total amount of not more than about 2.0% by weight of the dispersion; and
   the balance water.

2. The anti-tack dispersion of claim 1, wherein the talc particles have a TCS content less than 0.5% by weight.

3. The aqueous anti-tack dispersion of claim 1, wherein the talc is a blend of two differently sized talc particles wherein a size difference between the two differently-sized talc particles is at least two microns.

4. The aqueous anti-tack dispersion of claim 3, wherein the talc blend is based on a weight ratio of larger to smaller particles of 1.5:1 to 9:1.

5. The aqueous anti-tack dispersion of claim 1, wherein the talc particles are formed into a talc agglomerate as a result of the polyquaternary cationic polymer, a median particle size of the talc agglomerate being up to 25% more than the median particle size of the talc particles.

6. The aqueous anti-tack dispersion of claim 1, wherein the total solid content ranges from 45 to 55% and the suspension aids are included in the anti-tack dispersion.

7. The aqueous anti-tack dispersion of claim 1, wherein the solid content ranges from 50 to 75%.

8. The aqueous anti-tack dispersion of claim 1, wherein the polyquaternary cationic polymer is in amount ranging from 0.01 to 0.25% by weight of the dispersion.

9. The aqueous anti-tack dispersion of claim 8, wherein the polyquaternary cationic polymer ranges from 0.01 to less than 0.10% by weight.

10. The aqueous anti-tack dispersion of claim 1, wherein the polyquaternary cationic polymer comprises epichlorohydrin-dimethylamine (Epi-DMA), one or more polyquaterniums, or a combination thereof.

11. The aqueous anti-tack dispersion of claim 10, the polyquaternary cationic polymer comprises polydiallyldimethyl ammonium chloride.

12. The aqueous anti-tack dispersion of claim 1, wherein the one or more nonionic surfactants of intermediate HLB value of 6 to 12 in a total amount range from about 0.5 to 2.0% by weight of the dispersion.

13. The aqueous anti-tack dispersion of claim 1, wherein the one or more nonionic surfactants comprises ethoxylates of alkylphenols, ethoxylates of 2,4,7,9-tetramethyl 5 decyn-4,7-diol, ethoxylates of linear or branched fatty alcohols having a carbon chain length ranging from $C_6$-$C_{18}$, EO/PO alkoxylates of linear or branched fatty alcohols having a carbon chain length ranging from $C_6$-$C_{18}$, ethylene oxide/propylene oxide block copolymers, ethoxylates of sorbitan esters, ethoxylated fatty acids, ethoxylated castor oils, ethoxylated fatty amines, and PEG esters or diesters of saturated or unsaturated $C_8$ to $C_{20}$ fatty acids.

14. The aqueous anti-tack dispersion of claim 13, wherein one or more alkali metal, saturated or unsaturated, $C_8$-$C_{20}$ fatty acid soaps comprises sodium or potassium soaps of saturated or unsaturated $C_8$-$C_{20}$ fatty acids.

15. The aqueous anti-tack dispersion of claim 1, wherein the one or more alkali metal, saturated or unsaturated, $C_8$-$C_{20}$ fatty acid soaps in a total amount range from about 0.01 to less than 2.0% by weight of the dispersion.

16. The aqueous anti-tack dispersion of claim 1, wherein the anti-tack dispersion can include one or more of the following additives:
   one or more defoamers in a total amount of not more than about 1.0% of the total dispersion weight; and
   one or more biocides in a total amount of not more than about 0.15% by weight of the dispersion.

17. The aqueous anti-tack dispersion of claim 1, wherein the anti-tack dispersion has one or more of the following viscosities:
   an initial 2 rpm static Brookfield Viscosity of 5,000 to 25,000 cps;
   a two-week aged 2 rpm static Brookfield Viscosity less than 150,000 cps;
   a two-week aged 20 rpm dynamic Brookfield Viscosity less than 25,000 cps;
   wherein the initial and aged static and dynamic viscosities are measured using a Brookfield RVDVE heliopath viscometer unit equipped with T-spindles and are run at 2 or 20 rpm and 25 degrees C.

18. The aqueous anti-tack dispersion of claim 17, wherein the talc is substituted with at least one anti-block pigment in an amount up to 25% of the total weight of talc in the formulation.

19. The aqueous anti-tack dispersion of claim 18, wherein the anti-block pigment is selected from the group consisting of kaolinite, calcined kaolin clays, smectite clay minerals, attapulgite, sepiolite, barytes, nepheline syenite, ground calcium carbonate, precipitated calcium carbonate, dolomite, fine particle micas consisting of muscovite or phlogopite, feldspars, synthetic amorphous silica pigments, alumina trihydrate, hydrotalcite and one or more metal stearate pigments.

20. The aqueous anti-tack dispersion of claim 19, wherein smectite clay minerals comprise bentonite and hectorite.

21. The aqueous anti-tack dispersion of claim 19, wherein the synthetic amorphous silica pigments comprise precipitated silica and fumed silica.

22. The aqueous anti-tack dispersion of claim 19, wherein the one or more metal stearate pigments comprise calcium stearate, magnesium stearate and zinc stearate.

23. An aqueous anti-tack dispersion comprising talc particles having a median particle size range of less than 7 microns, the talc particles in an amount ranging from 40% to 72% of the total dispersion weight, the aqueous anti-tack dispersion having a total solids content 45-75% by weight of the dispersion, the anti-tack dispersion further comprising:

at least polydiallyldimethyl ammonium chloride as a polyquaternary cationic polymer having a molecular weight between about 200,000 to 2,000,000 Daltons and in an effective amount to at least prevent hard pack settling of the talc when the anti-tack dispersion is used in a diluted form for coating uncured rubber compound products and/or improving anti-tack coating coverage of the uncured rubber compound products;

one or more of ethoxylates of tridecyl alcohol and ethoxylates of 2,4,7,9-tetramethyl 5 decyn-4,7-diol nonionic surfactants in an amount ranging from about 0.01-4.0% of the total dispersion weight;

one or more sodium or potassium soaps of saturated or unsaturated $C_8$-$C_{20}$ fatty acids in an amount ranging from about 0.01-3.0% of the total dispersion weight; and one or more pigment suspension aides of fumed silica, xanthan gum and sepiolite in a total amount ranging from about 0.0-2.0% of the total dispersion weight;

optionally, one or more of dazomet, glutaraldehyde, and/or 1,2-benzisothiazolin-3-one in a combined active basis amount ranging from about 0.0-0.15% of the total dispersion weight; and the balance water.

24. The anti-tack dispersion of claim 23, wherein the talc particles have a TCS content less than 0.5% by weight.

25. The aqueous anti-tack dispersion of claim 23, wherein the amount of the one or more ethoxylates of tridecyl alcohol and ethoxylates of 2,4,7,9-tetramethyl 5 decyn-4,7-diol nonionic surfactants ranges from about 0.5 to 2.0% by weight of the dispersion.

26. The aqueous anti-tack dispersion of claim 23, wherein the amount of the one or more sodium or potassium soaps of saturated or unsaturated $C_8$-$C_{20}$ fatty acids ranges from about 0.01 to less than 2.0% by weight of the formulation.

* * * * *